United States Patent [19]
Chenausky

[11] Patent Number: 6,134,256
[45] Date of Patent: Oct. 17, 2000

[54] SLICE LASER

[75] Inventor: Peter Chenausky, Avon, Conn.

[73] Assignee: QSource, Inc., East Hartford, Conn.

[21] Appl. No.: 09/072,093

[22] Filed: May 4, 1998

Related U.S. Application Data

[63] Continuation-in-part of application No. 08/870,857, Jun. 6, 1997, Pat. No. 5,748,663, which is a continuation of application No. 08/562,998, Nov. 27, 1995, abandoned, which is a continuation-in-part of application No. 08/361,729, Dec. 22, 1994, abandoned, which is a continuation of application No. 08/255,463, Jun. 8, 1994, abandoned.

[51] Int. Cl.[7] ........................................................ H01S 3/03
[52] U.S. Cl. ................................ 372/61; 372/61; 372/55; 372/82; 372/64; 372/65
[58] Field of Search ................................. 372/61, 55, 82, 372/64, 65

[56] References Cited

U.S. PATENT DOCUMENTS

| | | |
|---|---|---|
| 4,493,087 | 1/1985 | Laakman et al. . |
| 4,719,639 | 1/1988 | Tulip . |
| 4,884,282 | 11/1989 | Bridges . |
| 5,140,606 | 8/1992 | Yarborough et al. . |
| 5,373,528 | 12/1994 | Kuzumoto . |
| 5,412,681 | 5/1995 | Eisel et al. . |
| 5,513,196 | 4/1996 | Bischel et al. . |
| 5,748,663 | 5/1998 | Chenausky ................................ 372/64 |

*Primary Examiner*—Frank G. Font
*Assistant Examiner*—Delma R. Flores Ruiz
*Attorney, Agent, or Firm*—Alix, Yale & Ristas, LLP

[57] ABSTRACT

The performance of an RF excited gas laser having a discharge region with a generally curvilinear orthogonal cross-section, the shorter of the two dimensions of the discharge region cross-section being the spacing between non-conductive sidewalls which collisionally cool the discharge and are rotatable for guiding laser light, is enhanced by excitation field shaping. The field shaping includes use of a non-conductive member disposed between a high voltage field establishing electrode and a sidewall of the discharge region.

19 Claims, 12 Drawing Sheets

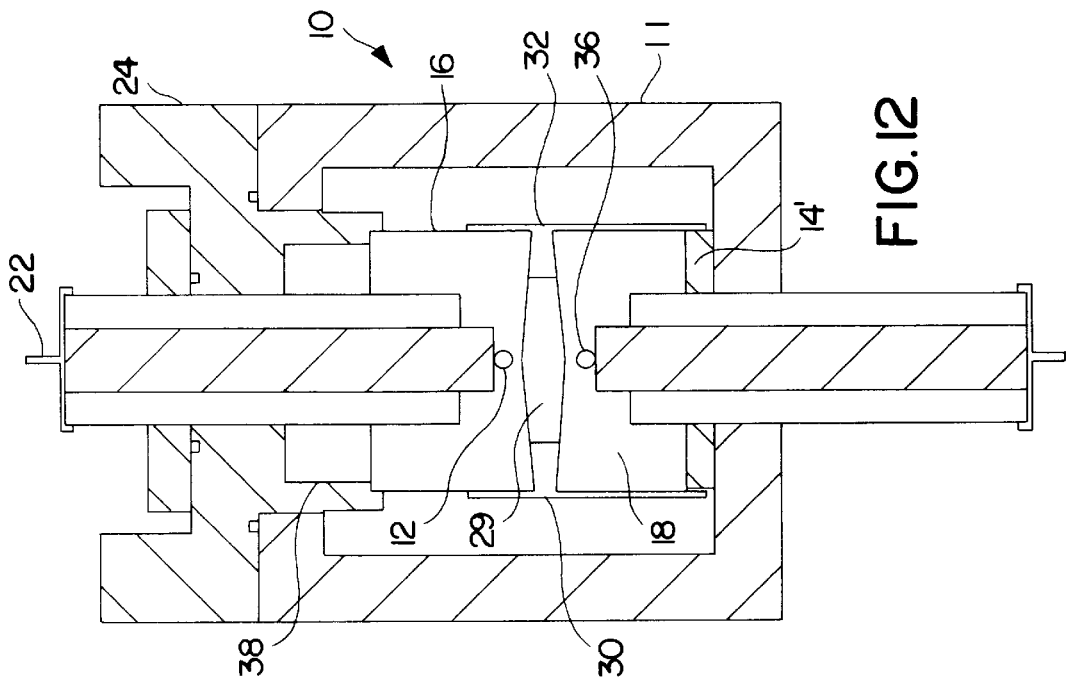
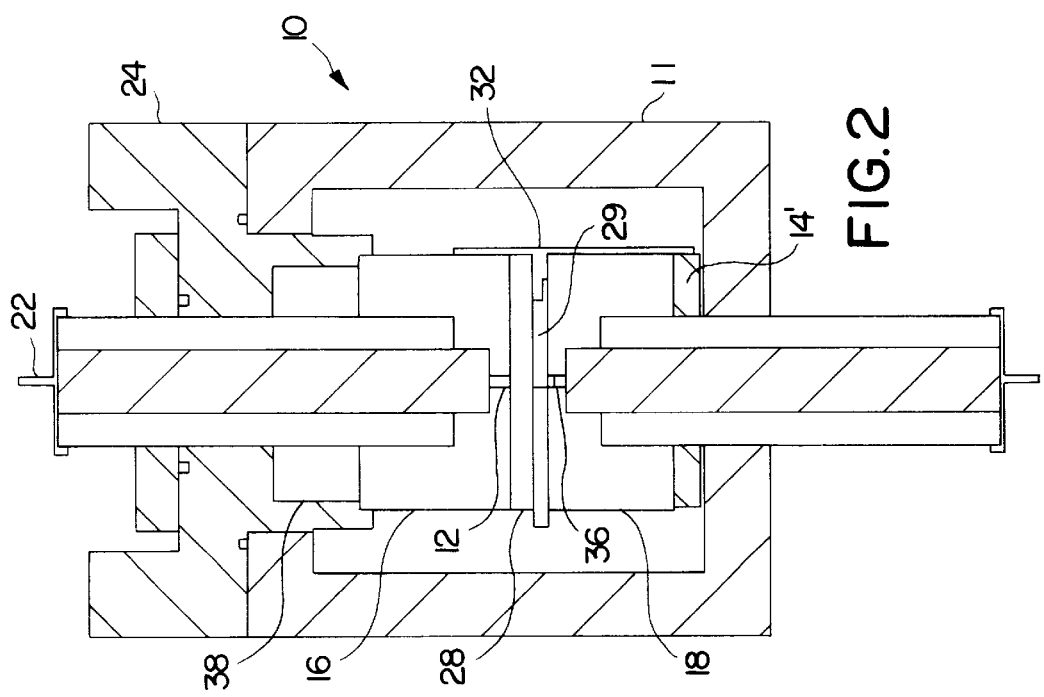

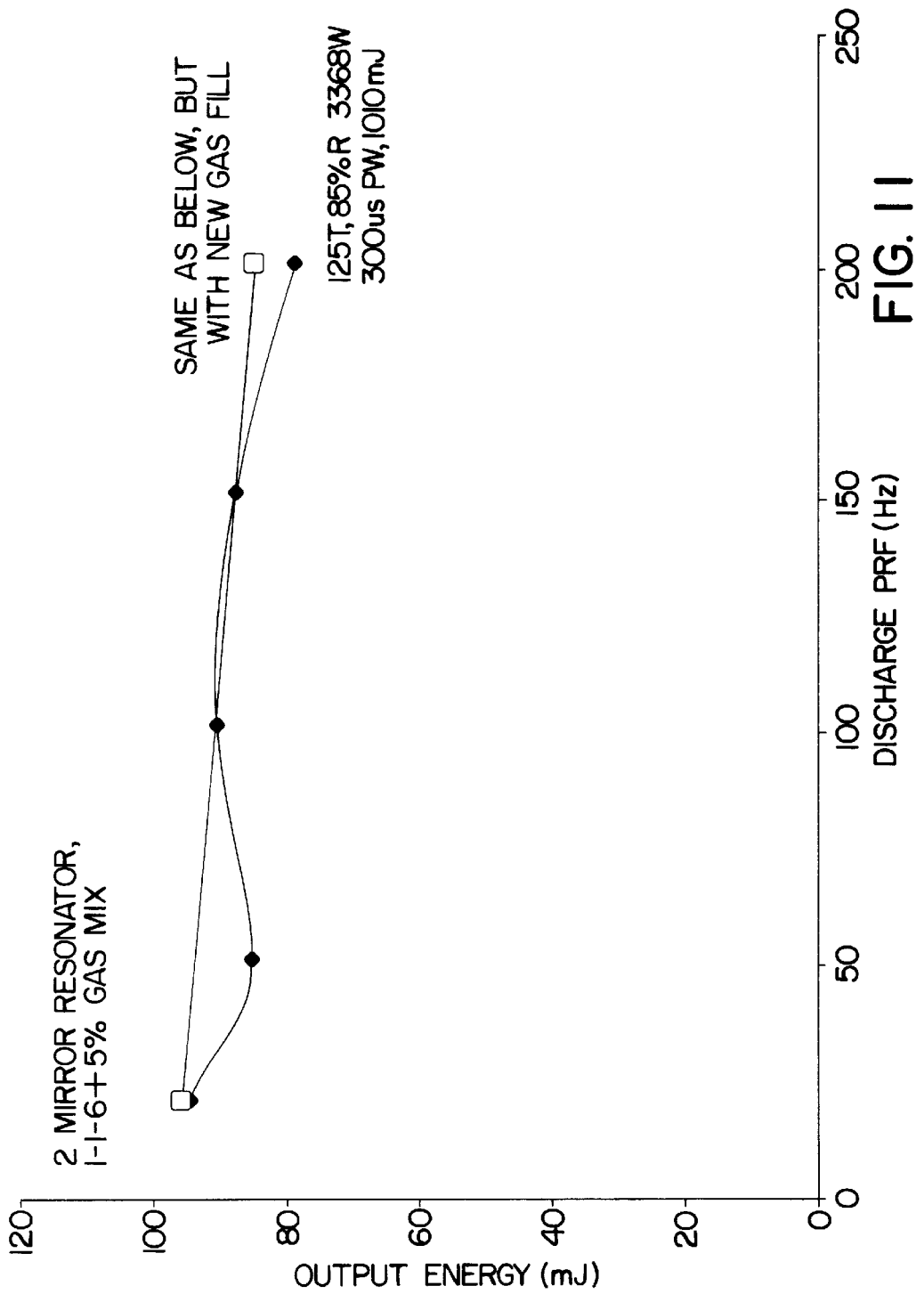

SLICE LASER

CROSS-REFERENCE TO RELATED APPLICATION

This application is a continuation-in-part of application Ser. No. 08/870,857, filed Jun. 6, 1997, now U.S. Pat. No. 5,748,663 dated May 5, 1998, was a continuation of Ser. No. 08/562,998, filed Nov. 27, 1995, abandoned, which was a continuation-in-part of Ser. No. 08/361,729, filed Dec. 22,1994, abandoned, which was a continuation of Ser. No. 08/255,463, filed Jun. 8, 1994, abandoned.

BACKGROUND OF THE INVENTION (1) Field of the Invention

The present invention relates to the generation of coherent light and, particularly, to excitation field shaping improvements in lasing devices characterized by a uniquely configured discharge cavity in which a stable plasma is area cooled by non-conductive sidewalls which also perform a light guiding function. More specifically, this invention is directed to improvements to RF excited gas lasers, and especially to lasers characterized by a discharge region having a generally curvilinear orthogonal cross-section, the shorter dimension of the discharge region being defined by the spacing between a pair of non-conductive sidewalls which are suitable for guiding laser light and which collisionally cool the discharge. Accordingly, the general objects of the present invention are to provide novel and improved methods and apparatus of such character.

(2) Description of the Prior Art

The present applicant has invented an RF excited gas laser having a discharge region cross-section of unique configuration. This invention is disclosed in the above-referenced related application which is incorporated herein by reference. Devices disclosed in the related application are known in the art as area cooled "slice" lasers for the purpose of distinguishing such devices from previously known area cooled "slab" lasers. A "slice" laser is characterized by an elongated gaseous discharge chamber or cavity which, for purposes of explanation, may be considered to have a generally rectangular cross-section. The discharge cavity cross-section is in part defined by a pair of non-conductive spacers which form opposed sidewalls. The average shorter dimension W of the discharge region cross-section is measured between these sidewalls. An excitation field(s) established in the cavity bounded by these sidewalls and another pair of oppositely disposed walls which interconnect the sidewalls will create a plasma discharge in a lasing gas confined in the discharge cavity. The other pair of discharge cavity defining walls, solely for purposes of explanation, may be considered to be the field establishing electrodes. The longer dimension D of the discharge region cross-section is thus the average spacing between electrodes of opposite polarity. Consequently, a slice laser has a discharge region cross-sectional shape where D/W>>1. Prior art D/W<<1 "slab" lasers were characterized by a discharge chamber defined in part by closely spaced parallel electrodes, i.e., electrodes having a width which was much greater than the electrode separation, and it was believed that an "input of 10–50 W/cm$^2$" was "possible only with a self-sustaining transverse RF discharge in a chamber with a small interelectrode spacing". Thus, prior to the invention of the related application, it was not thought possible to create a stable area cooled D/W>>1 discharge in a device having the above-described slice characteristics (Ref. Y. P. Raizer, M. N. Shneider and N. A. Yatsenko, "Radio-Frequency Capacitive Discharges", copyright CRC Press 1995, ISBN 0-8493-8644-6.

SUMMARY OF THE INVENTION

The present invention comprises improvements in and to the "slice" laser of the related application. These improvements constitute novel and unobvious features which enhance reliability and efficiency and, particularly, structure and techniques which contribute to the ability to achieve high output power and stable operation by exercising control over the excitation field.

In accordance with the present invention, the discharge characteristics in the aperture of a "slice" laser are tailored by one or a plurality of techniques. Most importantly, the discharge characteristics in the gain medium are optimized by insertion of a non-conductive field shaping member between the discharge cavity and at least one of the high voltage electrodes which is employed to establish the excitation field. Additionally, the thickness of the field shaping members(s), which functions as a sidewall of the cavity in a preferred embodiment, may be varied to modify the field. The field shaping achieved by the insert member may be augmented by varying electrode shape, including thickness, in split discharge embodiments. Further improvement in pumping may be achieved, in split discharge devices, by dual feed using pair(s) of ungrounded electrodes. Employment of a mirror image pair of high voltage electrodes fed in phase from an RF source, with both electrodes separated from the discharge cavity by ceramic field shaping members, is believed to offer high improved results. Alternatively, one of the high voltage electrodes may be utilized to supply dc bias, either alone or in addition to RF, in which case the field shaping member is omitted.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which:

FIG. 2 is a cross-sectional front elevational view of a second embodiment of a unitary discharge RF excited gas laser in accordance with the invention;

FIG. 11 is another graphical presentation of data indicative of the performance of a laser in accordance with the invention;

FIG. 12 is a cross-sectional front elevational view of another embodiment of a laser in accordance with the invention, the device of FIG. 12 having a polygonal shaped discharge chamber and employing the electrode arrangement of FIG. 5;

DESCRIPTION OF THE DISCLOSED EMBODIMENTS

Figure 1:
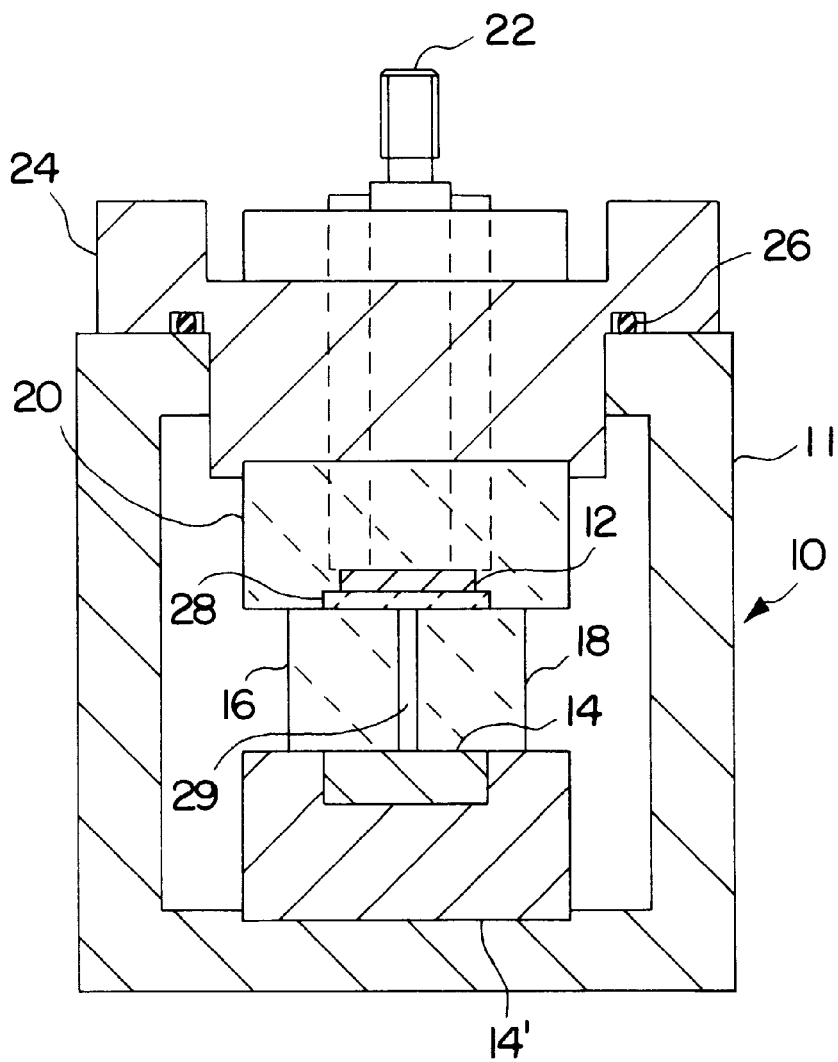
FIG. 1 is a cross-sectional, front elevational view of a first embodiment of an RF excited gas laser in accordance with the present invention, the laser of FIG. 1 operating with a unitary discharge.

Referring to FIG. 1, a laser in accordance with a first embodiment of the present invention is indicated generally at 10. Laser 10 includes a vacuum envelope 11 which will typically be comprised of aluminum. The components located within envelope 11 include an ungrounded, upper RF electrode 12 and a lower grounded electrode assembly 14. Upper electrode 12, hereinafter the "high voltage" or "elevated potential" electrode, is spaced from lower electrode 14 by ceramic spacers 16 and 18. Spacers 16 and 18 may be fabricated from $Al_2O_3$. Upper electrode 12, as may be seen for example from FIG. 5 of application Ser. No. 08/870,857, is elongated and is received in a complementary shaped slot in a first surface of a further ceramic member 20. In accordance with the present invention, the lowermost surface of high voltage electrode 12 is displaced from a plane defined by the parallel uppermost surfaces of the spacers 16 and 18, i.e., electrode 12 is recessed relative to the adjacent side wall of the discharge region or cavity 29 of the laser. A further ceramic member 28, which primarily functions to tailor the RF electric field in the discharge region 29, is located between electrode 12 and the gas discharge region. Accordingly, the chamber in which the active lasing gas is confined is, on its four sides, defined by oppositely facing surfaces of spacers 16 and 18., field shaping member 28 and by grounded electrode 14.

All of the intravacuum components shown in FIG. 1 may be held under compression via a removable cover piece 24 as shown or, alternatively, by a metal wedge arrangement built into the lower electrode 14. The cover 24 is sealed to vacuum envelope 11 by means of a suitable seal, for example an O-ring 26 as shown. Similar sealing arrangements are provided for the mirror mounts, not shown, that support the cavity mirrors at the opposite ends of discharge cavity 29. This arrangement of mirror mounts may be seen, for example, from FIGS. 5 and 6 of application Ser. No. 08/870,857.

Radio frequency power, desirably at an ISM frequency, is delivered to high voltage electrode 12 via an RF connector 22 which extends through an aperture in envelope 11 and a corresponding hole in ceramic spacer 20. An anti-breakdown bushing 38 located above the upper surface of spacer 16, not shown in FIG. 1 but depicted in FIGS. 2–4, enables the use of high peak RF power inputs at high discharge pressures. Impedance matching for the laser is preferably accomplished in the manner disclosed in U.S. Pat. No. 4,751,717.

The lower electrode assembly, in the embodiment of FIG. 1, comprises the actual electrode 14 and a conductive support block 14' having an electrode receiving recess. Block 14', in turn, is located in a complementary slot provided on the interior of vacuum envelope 11 and in intimate contact therewith. Envelope 11 will customarily be grounded and, accordingly, the electrode assembly 14, 14' will also be grounded. The term "ground" is used herein synonymous with "potential", i.e., a grounded electrode is understood to have a potential which is different from an ac or dc potential even though the ac (or RF) potential passes through a zero (0) voltage level during each cycle thereof.

In the embodiment of FIG. 1, the spacers 16 and 18 define the longer, opposed sides of discharge region or cavity 29. As explained in detail in application Ser. No. 08/870,857, cavity 29 has a unique cross-sectional configuration, which defines a discharge aperture, characterized by a longer and a shorter side, the longer side being measured between electrodes of opposite polarity and the shorter side being measured between a pair of sidewalls, i.e., the facing surfaces of spacers 16 and 18 which both confine and cool the gas discharge. In accordance with the present invention, the high voltage electrode 12, i.e., the electrode connected to an RF generator which is the source of the power which creates a plasma in cavity 29, is isolated from cavity 29 by the field shaping ceramic insert 28. The main function of insert 28 is to alter the vertical and horizontal components of the electric field in the discharge chamber and, as a secondary function, insert 28 electrically isolates electrode 12 from the plasma. Insert 28 is, accordingly, made of a dielectric of high relative dielectric constant. Applicant has discovered that manipulation of the dielectric constant and shape of element 28 can be used to tailor the vertical and horizontal components of the RF field in regions of discharge chamber 29 thereby permitting a significant increase in the discharge power energy which translates into a significant increase in output power and efficiency. In the embodiments of FIGS. 1–4, the cross-section of cavity 29 is generally rectangular with deviations from this cross-sectional shape being attributable to shaping of the grounded electrode(s) as described in the related application. However, as will be discussed below in the description of FIGS. 12 and 13, applicant's invention as described in both the present and relation application encompasses other geometrics.

The embodiment of FIG. 2 differs from that of FIG. 1 by the addition of a second ungrounded electrode 36 disposed oppositely with respect to high voltage electrode 12. In addition, the grounded electrode 14 of the FIG. 1 embodiment is replaced by grounded electrode 32. Electrode 36 may be employed for dc biasing of the discharge in which case, as shown, it will not be separated from the cavity 29 by a field shaping member insert. Electrode 36 will, however, preferably be recessed relative to the discharge cavity sidewall for the reasons to be explained below. If the RF power source is connected to both of electrodes 12 and 36 and RF/dc operation is not desired, a second field shaping member, i.e., a second ceramic plate insert 28, may be utilized.

Figure 3:
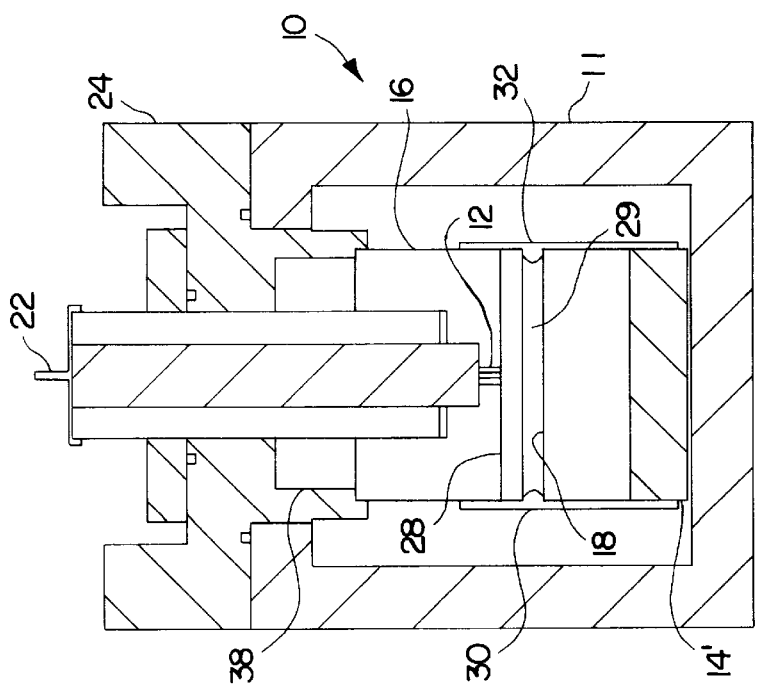
FIG. 3 is cross-sectional, front elevational view of a third embodiment of an RF excited gas laser in accordance with the invention, the laser of FIG. 3 operating with a split discharge.

The embodiments of FIGS. 1 and 2 are characterized by a unitary discharge. FIG. 3 depicts a split discharge device similar to that shown in FIG. 7 of the related application. In one reduction to practice, a laser as depicted in FIG. 3 utilized an aluminum vacuum envelope 11 with a three inch outer diameter and a 0.375 inch thick wall. The overall length of the vacuum envelope was 16.860 inches. In the same reduction to practice, a 22 mm wide by 3.56 mm high split rectangular $CO_2$ discharge was confined to the region between lower $Al_2O_3$ ceramic spacer 18 and upper field shaping member 28, which define the discharge cavity sidewalls, and left and right grounded aluminum electrodes respectively indicated at 30 and 32. RF power to energize the discharge at 27.12 MHz was delivered to high voltage electrode 12 which was inset in the upper surface of the upper ceramic spacer 16. The grounded electrodes 30 and 32 were mechanically and electrically attached to a conductive plate 14' and all of the intravacuum pieces were held in compression by an elongated cover 24. The high voltage electrode 12, in one reduction to practice, had a width of 0.0625 inches, a height of 0.250 inches and a length of 13.420 inches (34.1 cm). The vacuum envelope was evacuated and backfilled with a $CO_2$—$N_2$—He: 1-1-8+5% xenon gas mixture. Energization with RF power at 27.12 MHz generated a discharge with a total width of 2.2 cm, a height of 3.56 mm and a length of 34.1 cm. This discharge was collisionally cooled by upper 75 $cm^2$ and lower 75 $cm^2$ ceramic sidewalls which kept the gain medium from degenerating into an undesirable arc. As in the case with the embodiments of FIGS. 1 and 2, the high voltage electrode 12 was dc blocked relative to the discharge by a field shaping ceramic plate 28, the exposed surface of plate 28 thus defining one of the sidewalls of the discharge chamber. In one reduction to practice, a desirable field distribution was obtained when ceramic plate 28 was a 1.500 inch wide×⅛ inch thick alumina sheet.

All of FIGS. 2, 3, 4 and 12 depict the above-mentioned ceramic or Teflon anti-breakdown bushing 38 that fits tightly around the outer diameter of the RF input connector just above the upper surface of the upper ceramic spacer 16. Bushing 38 increases the distance from the elevated potential electrode 12 to the grounded cover 24.

Figure 4:
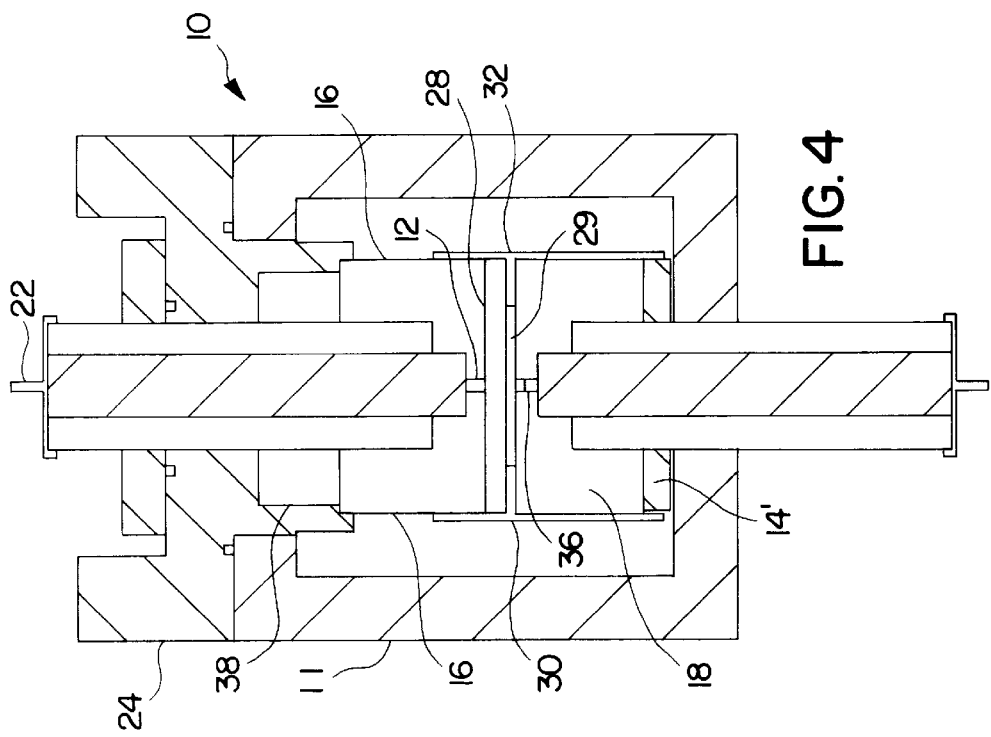
FIGS. 4 and 4A are views, similar to FIG. 3, showing modified forms of the laser of FIG. 3.

In yet another embodiment, depicted in FIG. 4, RF and dc high pressure laser operation is, similar to the FIG. 2 arrangement, accomplished by the use of separate RF and dc power inputs via respective separate ungrounded electrodes 12 and 36. Like the discharge aperture shown in FIGS. 2 and 3, the "dual feed" embodiment of FIG. 4 employs a single upper and a single lower ceramic spacer, these spacers being respectively indicated at 16 and 18. The laser of FIG. 4 has grounded electrodes 30 and 32 that set the discharge region sidewall spacing to as small as 1.93 mm (0.076"). The discharge region sidewalls, defined by spacer 18 and ceramic field shaping member 28, provide cooling and stabilization of the discharge gases by wall collisions even at high $CO_2$ laser gas discharge pressures. The field shaping member 28, in the form of a slab of alumina, serves to modify the components of horizontal and vertical RF electric fields in the discharge space 29, and to additionally dc block the upper central RF electrode 12.

In reductions to practice of the present invention, electrode 12 was made from either 0.0625" or 0.125" thick aluminum sheet. The alumina slab 28 was 1.5" wide and had a height or thickness of up to 0.250". The thickness of alumina slab 28, the horizontal width of the central electrode 12, the distance between electrode 12 and electrodes 30 and 32, and the vertical dimension of alumina spacers 16 and 18 are all found to effect the relative strength of the horizontal and vertical components of the RF field in discharge chamber 29.

The second ungrounded electrode 36 was also comprised of 0.0625" or 0.125" thick aluminum and was slightly recessed from the lower ceramic sidewall surface as shown. This slight recession results in additional cooling of any plasma sheath near electrode 36. The lower central electrode 36 is, with dc biasing only, left in contact with the discharge gases, i.e., electrode 36 may not be dc blocked if the addition of dc is desired via this electrode.

The use of a field shaping alumina slab 28 to separate one or both central electrodes in a "dual feed" geometry such as that of FIG. 4 serves to modify the horizontal and vertical components of the RF electric field in the slice discharge chamber. RF field components in both the horizontal and vertical directions in the discharge chamber influence the electron and ionic drift velocities in the laser plasma discharge. Therefore, field shaping in accordance with the invention, helps tailor the electron distribution functions, charged specie production and loss rates for the discharge pumping process. In the prior art gas discharge devices, adjustment of the drift velocities and electron loss rates have been used to analytically explore the effects of influencing the discharge electric field to pressure ratio and other parameters. Thus, while tailoring discharge kinetic parameters in an RF excited laser is known to be desirable, except for the use of gas additives such as Cesium or Xenon, a systematic and practical experimental approach for implementing such changes has not previously been elucidated.

Figure 4A:
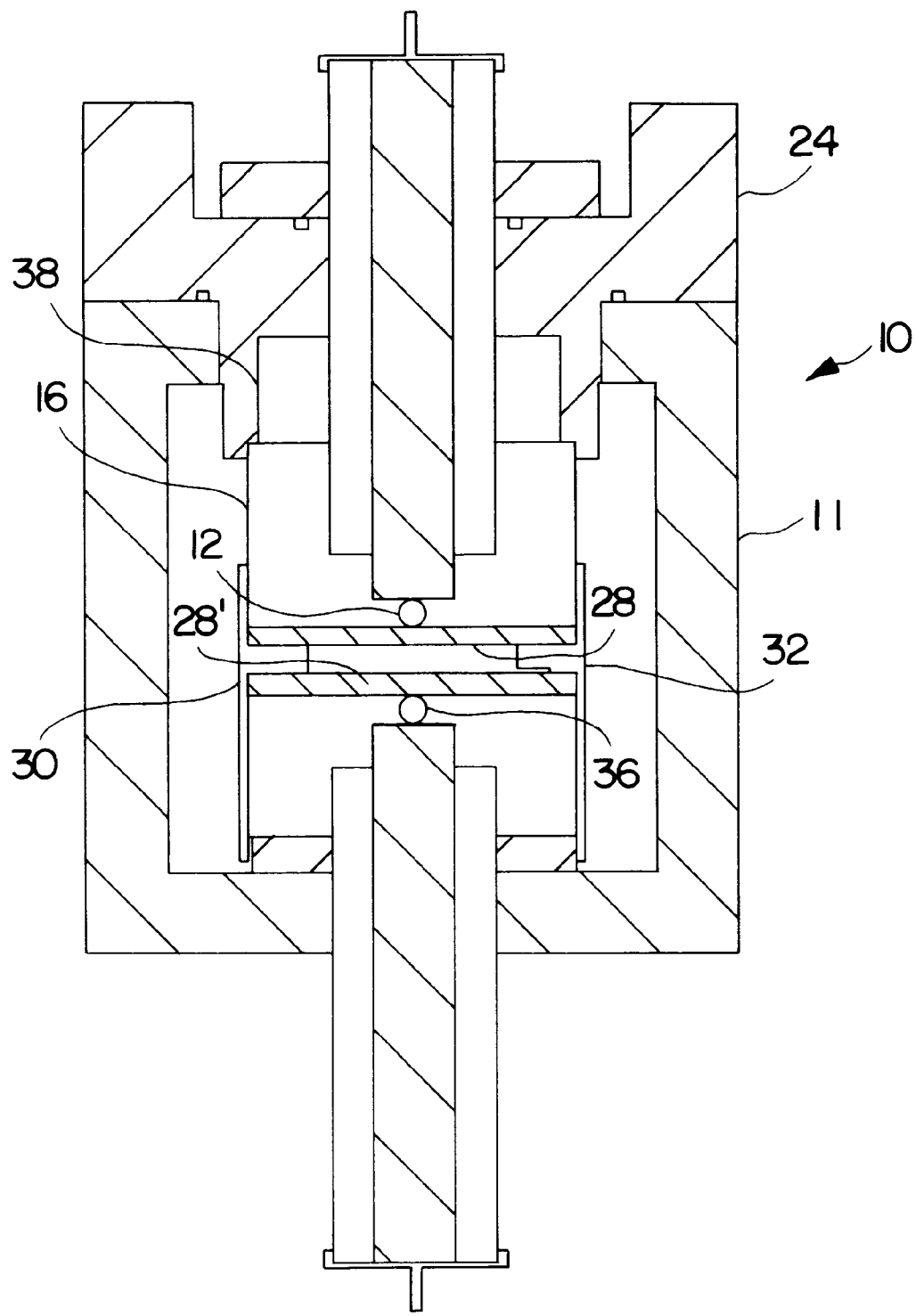

As shown in FIG. 4A, a pair of symmetric ceramic field shaping members 28, 28', respectively associated with the upper and lower central electrodes, may be employed. Such symmetric use of field shaping dielectric members has, for example, been found to be advantageous when RF power is applied to electrode 36 as, for example, shown in FIG. 8 of the related application. Dual in-phase feed of RF power is particularly advantageous in the FIG. 4A embodiment and results in enhanced excitation field uniformity.

Although the grounded electrodes 30 and 32 are depicted in FIGS. 2 and 4 as having basically flat surfaces facing inwardly toward the central electrodes, a number of different shapes with concave inward and convex outward radii have been employed. Such convex shaped electrode faces are shown in FIG. 3. The provision of a radius at the left and right inward facing surfaces of the grounded electrodes insures against the introduction of a burr or unwanted sharp edge that could generate very high local electric fields.

The employment of a second (lower) central electrode 36 that is essentially an image of a first (upper) central electrode 12, as shown in FIGS. 2, 4 and 12, may be utilized to improve discharge chamber electric field uniformity. Additionally, the physical characteristics, particularly the thickness and shape of the faces, of the ungrounded electrodes may be manipulated to "fine tune" the field shaping accomplished with one or a pair of members 28.

The above-discussed embodiments of FIGS. 2–4 involve geometries wherein the separation, W, of the sidewalls confining the discharge in the vertical plane and the overall aperture dimension, D', in the horizontal dimension was such that D'/W was much greater than 1, i.e., in the range of 6.2:1 to 7.5:1, with total discharge aperture widths as great as D'=31 mm. Since the ceramic discharge cavity defining side walls of the various laser embodiments described above were nominally 42 cm long, the horizontal Fresnel numbers $N_d$ were in the range of 27.2 to 61.5, while the vertical Fresnel numbers $N_w$ were in the range of 0.21 to 0.81, taking into account verified laser oscillation on both the 10.6 um and 9.3 um $CO_2$ laser lines.

Figure 6:
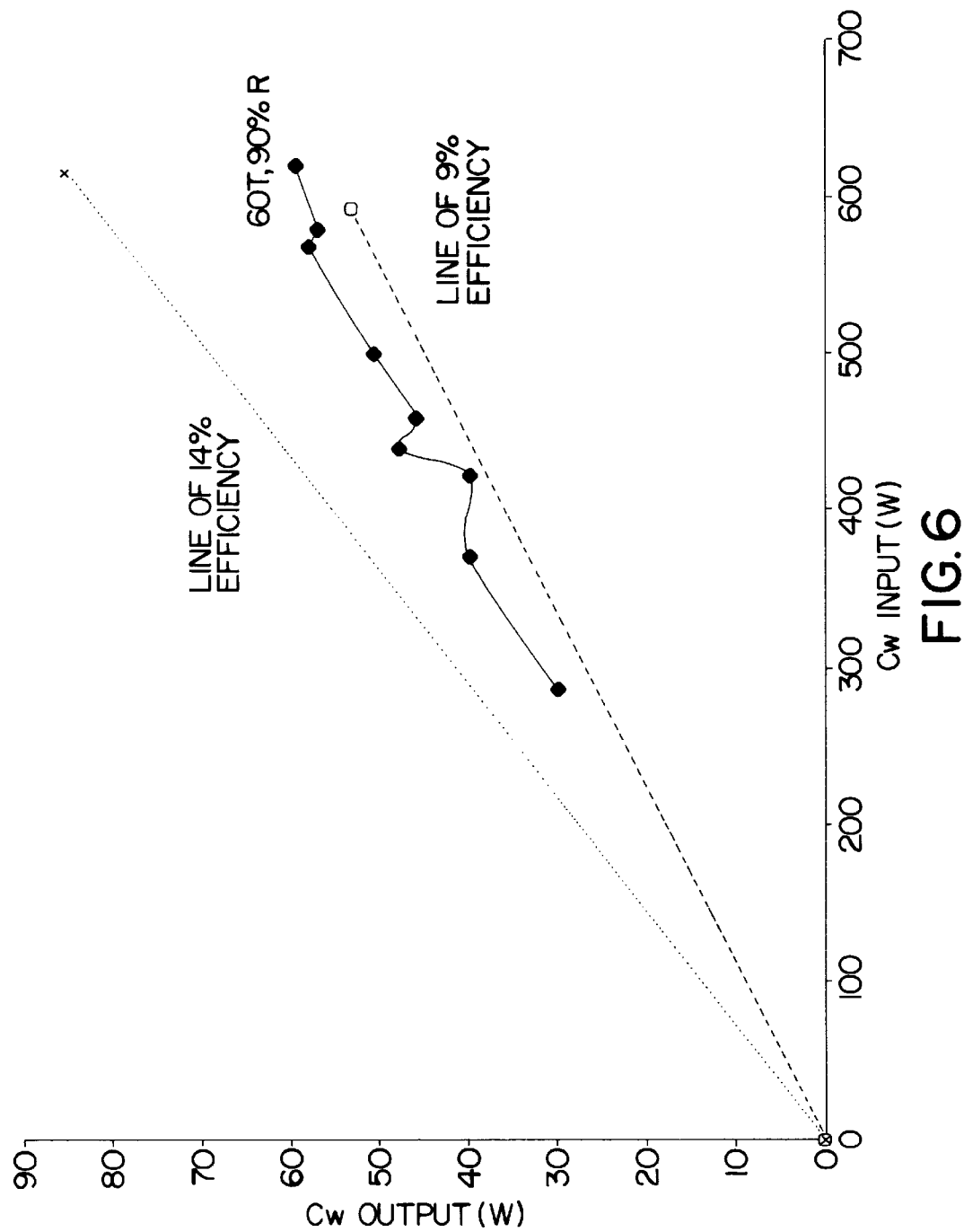
FIG. 6 is a graphical showing of the performance of a split discharge laser embodying the present invention.

Turning now to FIG. 6, a prototype of a FIG. 3 type device was sealed at one end with a 10 MCC total reflector, mirror mount and end flange and sealed at the other end with a 10 MCC, 90% R (@ 10 um) ZnSe output mirror with an AR coating on its rear surface, an additional mirror mount and end flange. The vacuum housing was evacuated and refilled to 60 Torr with a $CO_2$—$N_2$—He: 1-1-6+5% Xenon mixture. Laser oscillation will take place in such S a device when RF power at a frequency of 27.12 MHz is applied to the laser's RF input connector 22 via an impedance matching network using elements $C_4$, $C_5$ and $L_3$ shown in FIG. 3 of U.S. Pat. No. 5,097,472. As shown in FIG. 6, at a cw input power of about 620 W, an output power of 60 W at 10 um can be extracted from the laser. Because the laser cavity had Fresnel numbers in the dimension W of $N_W$=0.71 and in the dimension D of $N_D$=27.2, and cavity g values of $g_1$=$g_2$=1−L/R= 0.958, the laser output will be single mode in the aperture dimension W and multimode stable in the aperture dimension D. The data of FIG. 6 was obtained from a laser wherein the ceramic sidewalls each had a nominal surface area of 75 $cm^2$. Accordingly, the specific cw input power per unit of discharge volume is 23.3 $W/cm^3$ and the specific cw output power per unit of sidewall area is $P_0/A_{dis}$=0.8 $W/cm^2$.

The efficiency of laser operation depicted in FIG. 6 is seen to be about 10%. This is an improvement of 0.100% compared to a similar device wherein field shaping was not accomplished with member 28. Considering the use of 27.12 MHz excitation, air only cooling and waveguide operation, this performance level cannot be duplicated with prior art slab type area cooled $CO_2$ lasers even with water cooling of the electrodes. In terms of the laser operating parameters of pressure (p), excitation frequency (f), electrode separation (D), the pD and fD products of the FIG. 3 type device from which the FIG. 6 data was obtained are pD=660 T-mm (11 mm is the electrode separation) and fD=298 mm-MHz. Thus, without knowledge of the interior geometry of the device from which the data of FIG. 6 was generated, using only the size of the 22 mm by 3.56 mm output beam as a basis, one might conclude that the output was from a conventional prior art slab type of area cooled $CO_2$ laser operating at a pressure and laser excitation frequency of p=(133 T-mm)/(3.56 mm)=37 torr and f=(255 mm-MHz)/ (3.56 mm)=72 MHz to achieve the nominal 10% laser efficiency and a specific output power of 0.8 $W/cm^2$. However, these parameters are far from the actual operating parameters of p=60 Torr and f=27.12 MHz of the D/W=3.1 (half aperture) device from which the FIG. 6 data was obtained.

Figure 7:
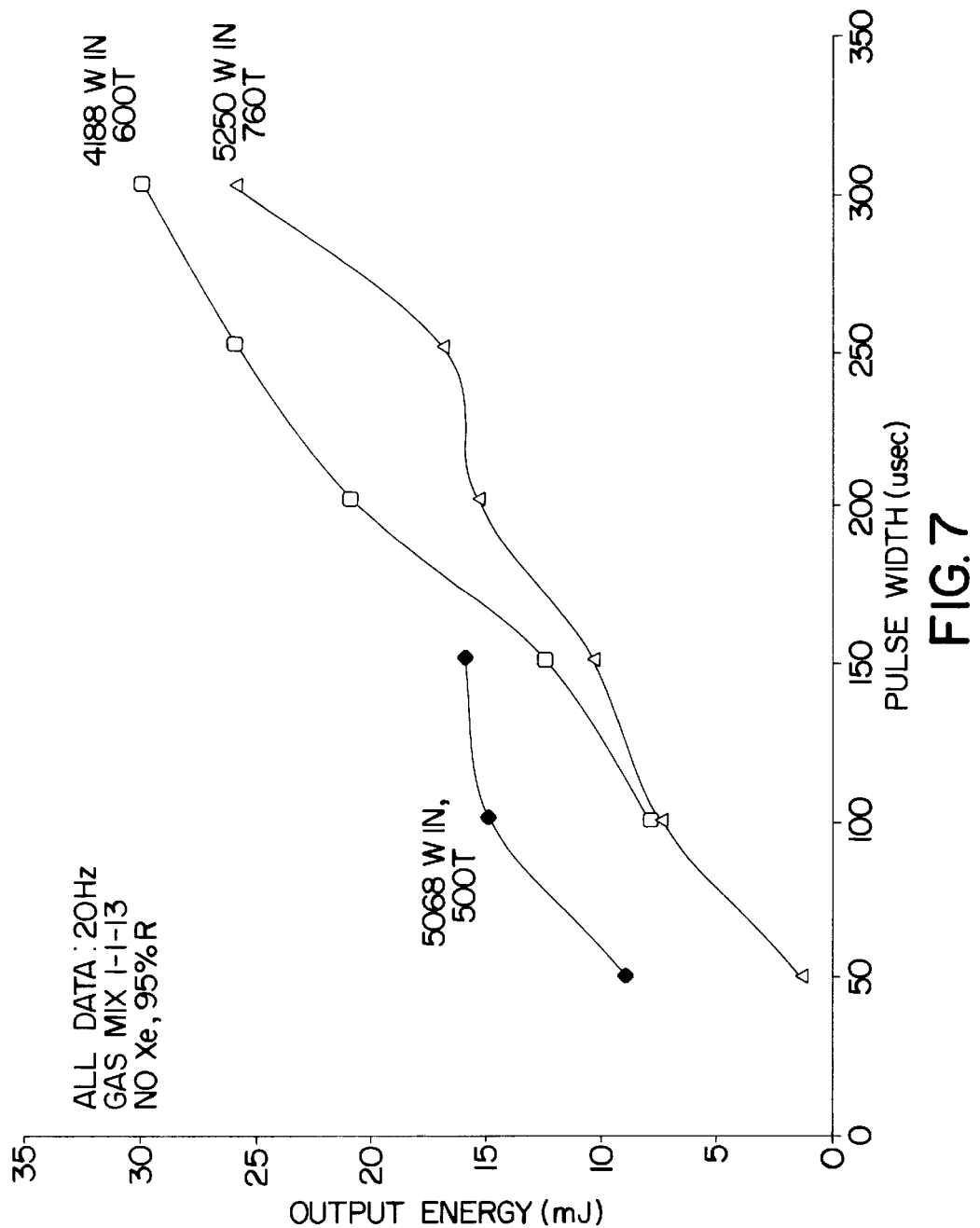
FIG. 7 is a further graphical depiction of the performance of a split discharge laser similar to that depicted in FIG. 3.

Referring to FIG. 7, the output mirror reflectivity of a laser made with the improvements shown in FIG. 3 device was increased to 95% (@ 10 um) and the gas mixture and sidewall spacing were changed to accommodate high pressure operation. The output pulse energy as a function of discharge pulse width, in the range of 50 microseconds (hereinafter usec) to a few hundred usec, shows a trend that is not that far from linear. Thus, while only 30 mJ/pulse is generated for an input of 1256 mJ, a discharge efficiency of 2.4% is quite remarkable when the operating pressure of 600 Torr and the non-Xenon enhanced gas mixture are taken into account. As one might expect, the general trend of the data in FIG. 7 is consistent with the efficiency of laser operation falling with respect to increased pressure. Notably, the D/W for the tests was D/W=11/1.93=5.7:1.

Based solely upon the 1.93 mm sidewall spacing dimension of the output beam corresponding to the FIG. 7 data, one might consider the output energy and efficiency as less than optimum for a prior art D/W<<1 area cooled slab device with close spaced electrodes if such a slab laser was operating at a p=(133 T-mm)/(1.93 mm)=69 Torr and excited at a frequency of f=(255 mm-MHz)/(1.93 mm)=132 MHz. Clearly, the discharge pressure and excitation frequency indicate that the operating characteristics of applicant's D/W>>1 device do not conform to, and are not explainable by, the D/W<<1 theory of operation of prior art slab lasers.

At a preliminary maximum operating pressure of 800 T (not shown in FIG. 7), an 11 mm electrode separation corresponds to a laser pD product for the D/W=5.7 device of pD=8800 T-mm. Also, a straight-forward calculation of the fW product indicates ;that fW=52.3 mm-MHz for the D/W= 3.7:1 device. Consequently, the if pD, fW and the pW correspond to an operating range that is not compatible with the operation of a conventional prior art D/W<<1 area cooled slab device. It is clear, therefore, that wall cooling in the D/W>>1 devices can only be explained by the fact that the invention of the related application and the improvements thereto herein described, operate in a manner that permits the benefits of both low frequency excitation and high pressure operation to be achieved simultaneously. Therefore, the close spaced sidewall cooling function in a D/W>>1 device is decoupled from the requirement to use high frequency RF excitation. Likewise, wide electrode spacing is seen to be decoupled from the requirement to use low discharge pressures. Said in another way, high pressure operation and low frequency excitation in a D/W>>1 device are not mutually exclusive. In addition, either or both decoupling modes are achievable without a sacrifice in specific output levels or device efficiencies.

Operation of a split discharge slice laser with a 11 mm by 1.93 mm aperture at a pressure of 800 T suggests that a device with smaller values of W can operate at even higher pressures. This type of operation has important implications for excimer lasers such as ArF, KrCl, and XeCl which emit at wavelengths of 193 nm, 222 nm and 308 nm respectively. Scaling the 800 T laser data above which operated at with a Fresnel number of 0.21 in the dimension W to a wavelength of 193 nm implies use of a sidewall spacing of only 0.26 mm. Operation of a device with a W=0.26 mm at a pressure of 5938 T would have a pW product in the range of 1550 T-mm, equivalent to the 800 T operation of a W=1.93 mm device. Clearly, operation of a W=0.26 mm device at a pressure of nearly 8 atmospheres would require significant redesign of the vacuum envelope hardware disclosed herein for safe high pressure operation of an ArF laser; likewise, as mentioned earlier, care would have to be exercised to minimize the smallest of unwanted gaps between any of the various intravacuum ceramic and metal elements to minimize regions where a parasitic discharge might occur. Any such a parasitic discharges would consume RF or RF/dc pump energy in regions outside the intended laser discharge mode volume and thus result in low laser efficiency.

The stabilizing effects attributable to the close spaced sidewalls in a D/W>>1 laser are clearly manifested by the data of FIG. 7, and this operational factor combined with low frequency excitation can be exploited to make high power visible gas lasers realizable. Such lasers could be HeNe, Argon-ion or other noble gas ion lasers, whose operation is generally known to favor the use of low gas pressures and small apertures for cavity mode control.

For example, HeNe lasers are known to operate a total as pressure of about 1 Torr. At this pressure, a 100 usec buildup rate for a plasma instability is compatible with the use of kHz excitation frequencies. Also, at these low pressures, in a laser with a pair of close spaced electrodes in a conventional area cooled D/W<<1 (1 mm or less) RF/dc excited laser geometry, the resulting discharge impedance can be expected to be quite low. This follows because the transverse RF discharge voltage would be low while the input power of a low discharge efficiency laser would be comparatively high. At these low pressures, there may not be sufficient spacing between the close spaced electrodes to permit a set of plasma sheaths to be established for optimal HeNe laser action. Also, at such low laser operating pressures, where the mean time between collisions is so long, wide area cooled electrode spacings would seem to be favored. However, this would not be compatible with the operation of a HeNe device using prior art D/W<<1 area cooling because no discharge chamber surfaces would be present for purposes of mode control.

Thus, for a high power, D/W>>1 area cooled, low pressure HeNe laser system operating in the visible, it would be advantageous to use kHz region low frequency excitation employing electrode spacings that do not result in very low discharge impedances. At the same time, however, the laser will require sufficient collisional cooling capability close to the discharge medium to keep the gas from degenerating from the desired glow discharge into an undesirable arc. These factors are uniquely achievable using the close spaced sidewalls in D/W>>1 area cooled discharge device wherein closely spaced sidewalls provide both discharge cooling and mode control while at the same time widely spaced electrodes are compatible with the use of inexpensive low frequency excitation.

The situation for a high power visible ionic laser (argon-ion or other noble gas ionic laser systems) would even be more critical than a HeNe laser. Like the HeNe system, short wavelength visible emission argon-ion lasers operate at very low pressures; however, since the goal of an area cooled laser of such type might be for output powers in the range of Watts, typical discharge efficiencies in the $10^{-4}$ class would place a very high premium on a high level of discharge heat removal. In this case, the discharge operates in such a very high current, low voltage mode, that compared to other higher pressure gas laser systems, the plasma operates very near the discharge glow to arc transition region. For such a laser, the ceramic sidewalls providing the discharge cooling might be advantageously made from BeO to take advantage of the higher thermal conductivity of BeO relative to $Al_2O_3$. However, like a HeNe counterpart, wide electrode spacing for the proper establishment of plasma sheaths would be a significant consideration. Likewise, the use of low frequency excitation to widely spaced electrodes would provide the attainment of a discharge impedance level that would be compatible with efficiently coupling high laser input powers into the discharge. The design freedom afforded by a D/W..1 approach would result in afar superior visible ion laser than one using D/W,,1 technology.

Figure 8:
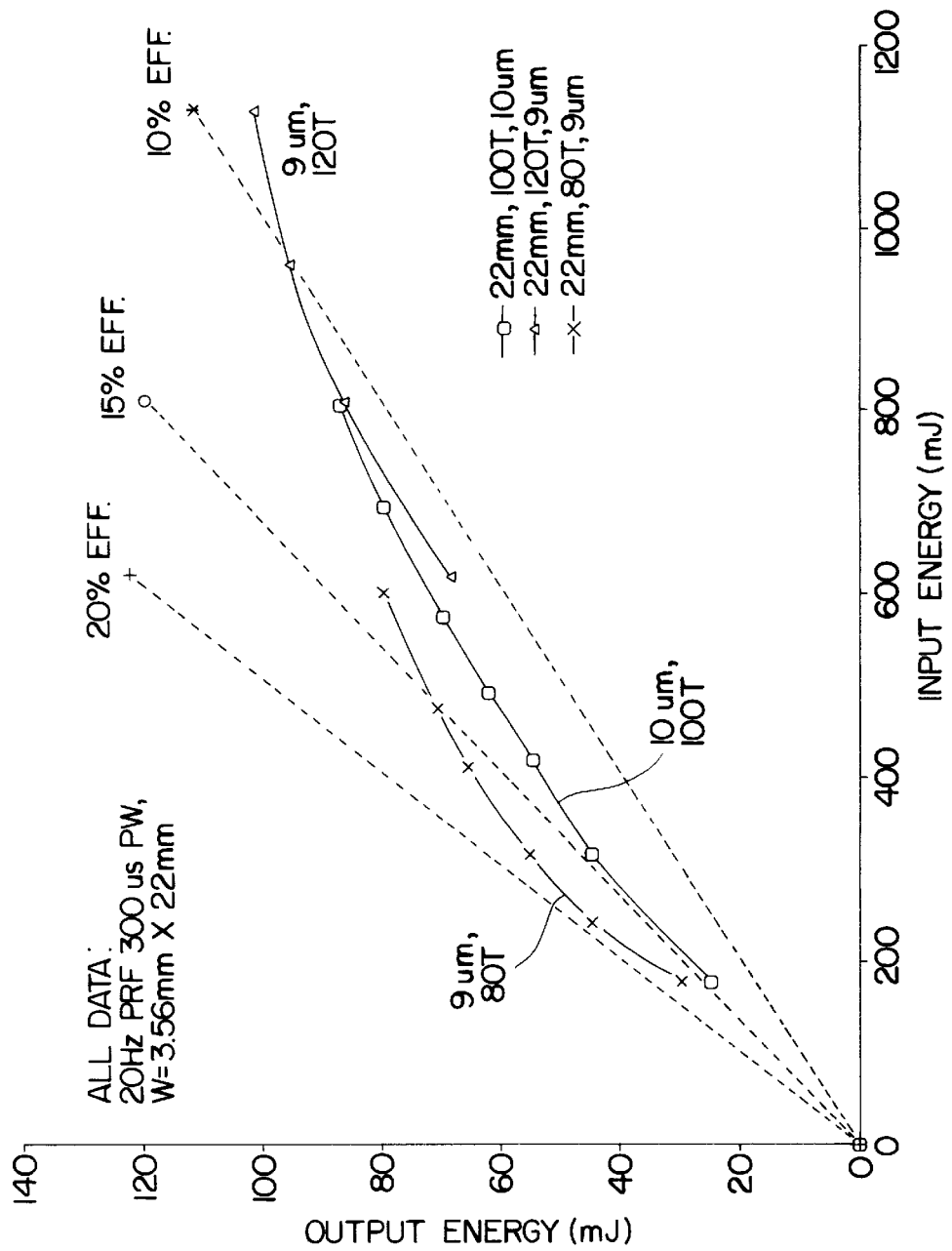
FIG. 8 is a further graphical showing of a performance of a split discharge laser in accordance with the invention.

At pressures in the range of 80 Torr to 120 Torr, the data in FIG. 8 shows that a field shape enhanced FIG. 3 type device can achieve high discharge efficiencies on both the 9.3 um and 10.6 um oscillation branches. Note that the pW product for the depicted data, which is related to the effectiveness of the collisional cooling provided by the sidewalls is in the range of 285 T-mm to 427 T-mm. These pW products for a slice laser are quite high when compared ot the pD products of high efficiency prior art area cooled slab lasers. Since a nearby physical structure is the only means providing collisional cooling, the pW product cooling range is quite high when compared to the pD product cooling range of high efficiency prior art area cooled slab lasers. This indicates that decoupling the pD, fD products of the prior art is already providing a more fundamental means by which to explore what roles are played by the pW, fW, pD and fD products of D/W>>1 area cooled devices. The FIG. 8 data also illustrates that although the basic $CO_2$ 9R20 gain at 9.3 um is not as high as the 1 OP20 gain at 10 um, it is notable that a 85% (9.3 um) coated mirror had a low enough reflectivity at 10 um to suppress 10P20 oscillation. Based on the pumping that these high gain transitions receive from $CO_2$ sequence and hot bands, the demonstrated independence of f and p in a slice discharge could be used in conjunction with the pW cooling function to force lasing on the hot or sequence bans by operating at a discharge pressure and sidewall spacing that promotes vibrational population up to $CO_2$ (00n) vibrational ladder while over-pumping the gas to thermally load the normal lower level to suppress ordinary (001) to (100) laser oscillation.

The FIG. 8 data also shows that at a pressure of 80 T, the discharge efficiency of 9.3 um laser output is nearly 20%. Indeed, when the losses in the matching network were factored in, the best discharge efficiency was confidently put at 22.5%. For an input power of just over 800 W for 300 usec, the pulsed output energy of 50 mJ yields a discharge efficiency of about 18%. For this data, the pW product is 285 T-mm, substantially higher than the pD product of 133 T-mm for a prior art slab device. While some of the performance at 9.3 um is due to the higher level of Helium in the $CO_2$—$N_2$—He:1-1-6+5% Xe gas mixture, this discharge efficiency is quite impressive for the long discharge pulse widths. With the level of output coupling fixed at 15% (85% R), operation at pressures higher than 80 Torr should show the effect of trading lower discharge efficiencies for higher output energies. Even so, a 10% discharge efficiency at a pW product of 427 T-mm is very impressive for an output energy of 95 mJ/pulse. This level of output corresponds to a peak laser output of nearly 320 W over the 300 usec discharge pulse duration.

Figure 9:
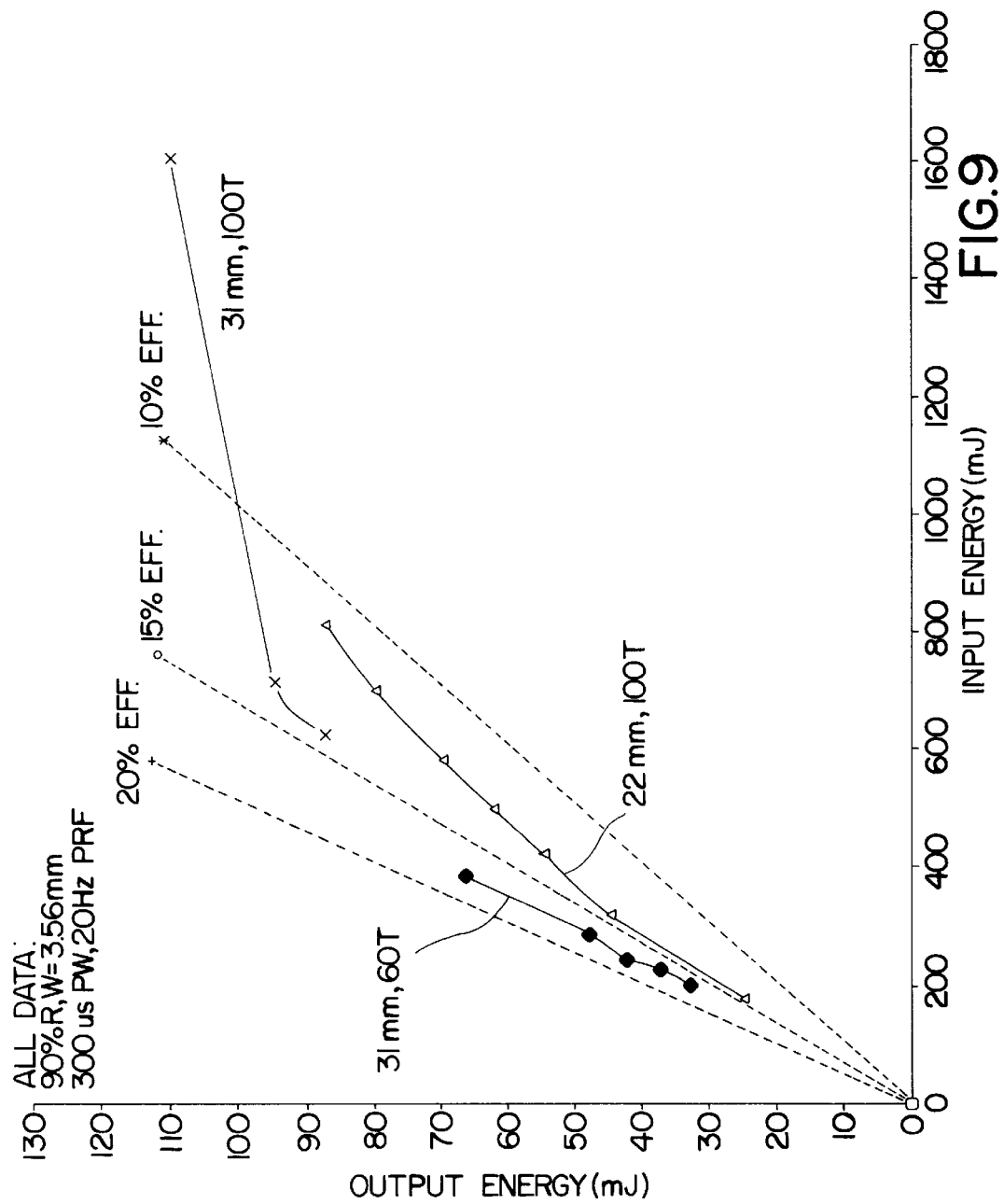
FIG. 9 is a graphical comparison of the performance of a pair of split discharge lasers in accordance with the invention.

The data of FIG. 9 illustrates that going from a 22 mm wide discharge aperture to a 31 mm discharge aperture results in higher output energies being obtainable from the larger discharge volume. The data for both aperture sizes used the same 1-1-6+5% gas mixture. However, while the extracted output using a 31 mm aperture is greater than the corresponding output with the 22 mm aperture, the increase in the output is not in the ratio of the increase in aperture size. As will be subsequently explained, this departure from linearity in output with aperture size has been correlated both with the higher luminosity in the discharge near the central elevated potential RF electrode and the inferred measurements of the horizontal and vertical components of the RF electric field strength as a function of location in the horizontal slice aperture.

Figure 10:
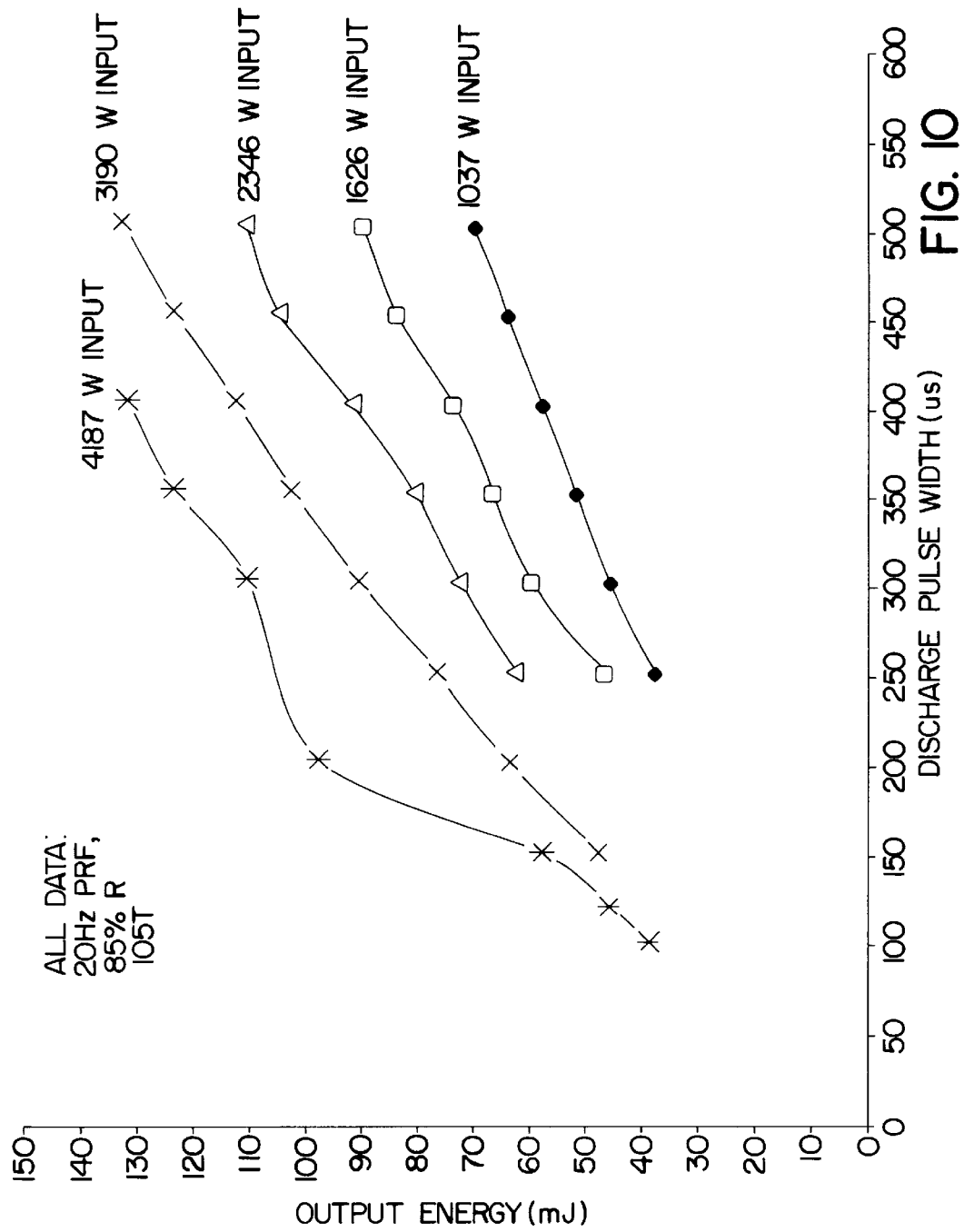
FIG. 10 is a further graphical depiction of the performance of a split discharge laser in accordance with the invention.

The data plotted in FIG. 10 shows that for discharge pulse widths from 100 usec to 500 usec in duration, the extracted per pulse output energy is essentially linear for peak RF input powers from about 1 kW to over 4 kW. The data also shows that, for a given output, longer pumping durations at lower input powers is somewhat more efficient than using higher pump powers for shorter durations. To some extent, however, some of this difference could be due to use of an output reflectivity and pressure that tends to favor longer pumping cycles.

Also, with reference to the data in FIG. 10, the cw data shown in FIG. 6 implies that high peak power pumping should be extendable to PRF's much higher than the 20 Hz rate adopted as a base PRF for much of the displaced pulsed data. Indeed, FIG. 11 shows this to be the case, at least for PRF's over the range from 20 Hz to 200 Hz. In the FIG. 11 data a 300 usec long, 3.368 kW peak RF input pulse could be increased from 20 Hz to 200 Hz without revealing more than a relatively minor effect on per pulse output energy. A similar data set using a 31 mm by 3.56 mm discharge aperture shows even less effect when the pulsed PRF was increased from 20 Hz to 200 Hz.

Overall, the FIG. 11 data indicates that at the highest PRF of 200 Hz, where the duty cycle of the discharge reaches 6%, the conversion efficiency is still 9%. This efficiency corresponds to a peak laser output of $P_o(peak)=0.09$ (3368 W), or approximately 300 W. For a nominal 75 cm$^2$ of discharge cooling area, the 9 um specific output power is equivalent to a specific peak output of over 4 W/cm$^2$. This confirms that area cooling provided by close spaced sidewalls is very effective even for moderately high duty cycles and fairly intense pumping conditions. These characteristics, for example, make a laser made according to the present invention ideal for applications involving the drilling of dental hard tissue, which favors the use of 9 um laser output with pulse widths that are under 500 usec in duration. The high PRF capability of the disclosed embodiments, therefore, permits a particular hard dental tissue procedure to be performed in a minimum period of time. Note that all of the data shown in the above-discussed figures employed ambient laboratory air as the only active means of cooling, thus products based on these embodiments are economically attractive because an expensive liquid cooling system is not required.

All of the data shown in FIGS. 6–11 were generated using generally rectangular cross-section discharge chambers, as depicted in FIGS. 3 and 4, having aperture dimensions that were either 22 mm or 31 mm measured between the two outer grounded electrodes 30 and 32 and were between 1.93 mm and 3.56 mm as measured between lower ceramic sidewall 18 and upper ceramic field shaping member 28. The distance between a vertical plane defined by central electrode 12 and either outer grounded electrode was approximately 11 mm or 15.5 mm, i.e., the electrode spacing does not count the small distance the central electrode 12 was recessed in one of the ceramic sidewalls. As such, all of the discharge apertures are characterized by a longer and a shorter side, the longer side D being measured between electrodes of opposite polarity and the shorter side W being measured between a pair of sidewalls that cool the gas discharge.

With further reference to FIGS. 3 and 4, specifically with regard to the improved operation of a discharge slice laser when a ceramic slab field shaping member was placed over the central electrode, it was observed that higher discharge RF input powers could be tolerated. The discharge impedance for a given input power and pressure was also observed to be higher than the geometry without the field shaping member. It was subsequently determined that various combinations of the single or dual feed geometries, use of thin (1/16" horizontal width) or thick (1/8" horizontal width) central electrodes, and having one or both central electrodes either unshielded or shielded with field shaping ceramic slabs of varying (1/8" to 1/4" vertical) thicknesses can provide a means of tailoring relative components of horizontal and vertical electric fields in the slice discharge chamber. Consequently, all these elements can be used to tailor the transverse slice discharge chamber field. For example, it has been found that a single feed geometry with a slightly recessed central electrode and no field shaping member has the highest total combined horizontal and vertical E fields in the region of the central electrode. Moreover, for a given W and D, the higher E fields for the single feed central electrode geometry without afield shaping element is manifested by a higher input capacitance of the discharge head. analysis and experiment also indicates that the single central electrode geometry without field shaping member has the greatest difference between the horizontal and vertical E fields in the slice discharge chamber. the in-phase driven dual feed geometry with both central electrodes behind field shaping alumina slabs was observed to have a near zero vertical field component just under the two central electrodes with a variation of total E field across the greater portion of the aperture of only approximately 6% of the maximum total field. Surprisingly, the inferred RF field measurements indicate that for this case, the horizontal E field is about 15% higher at the grounded electrode than it is 1 to 2 mm away from the grounded electrode. Moreover, changing the width of one of the central dual in-phase electrodes from 1/8" to 1/16" without changing the field shaping means results in a total field under the two central electrodes which has a non-zero minimum. It was also determined that a larger central conductor (3/8" diameter) in the RF input connector rather than a 1/4" diameter central conductor could significantly and deleteriously alter the electric field just under the central electrode. The use of an RF connector with a large central conductor was observed to be substantially less tolerant of higher peak discharge input powers. Overall analysis indicates that the dual feed geometry having one central electrode in contact with the discharge chamber while using only one ceramic field shaping member results in a relatively low E field under the central electrode when in-phase excitation is used, and correspondingly, this "unbalanced or slightly asymmetric" geometry has a larger vision in total x and y components of E field across the aperture than does the dual in-phase fed dual shielded central electrode geometry or the dual in-phase unshielded central electrode geometry. The advantage to the dual in-phase geometry using only one field shaping the central electrode without the field shaping member. Thus, at the expense of a somewhat less uniform RF field, the in-phase asymmetric geometry can be used to obtain high peak laser outputs without any increase in the peak laser RF input power. In the asymmetric in-phase configuration, the field minimum under the central electrode(s) region can be fine tuned b y using a relatively thin field shaping alumina slab and a modest variation of E field across the transverse slice aperture. This geometry uniquely permits using either in-phase RF excitation to both central electrodes or using RF alone on the dc blocked electrode and dc alone on the electrode not shielded with an alumina slab or in-phase RF on both central electrodes while dc is used only on the central electrode not shielded by the alumina slab.

Figure 5:
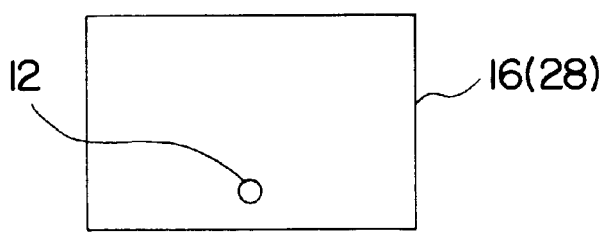
FIG. 5 is a cross-sectional view of a modified elevated potential or high voltage electrode arrangement which may be employed in a laser in accordance with the invention, FIG. 5 being a view similar to the views of FIGS. 3 and 4.

As shown in FIG. 5, field shaping can be accomplished by drilling a hole along the length of the upper sidewall defining spacer 16 at the approximate distance from the lower surface of the upper sidewall. The tolerance for the drilled hole need not be as stringent as that for a nominal 1/8" diameter light waveguide, since the function of the hole would be to only provide a chamber for receiving round electrode. This approach eliminates the need for a separate intravacuum alumina field shaping member(s) 28, and also allows the use of a round central electrode that can fit snugly into the drilled hole.

Referring again to FIG. 4, and more particularly with regard to the connection to central electrode 36 being made upward from below, when both dc and RF energization were introduced via a non-dc blocked, somewhat recessed central electrode 36, application of cw dc to the RF discharge circuit did not alter the starting or initiating properties of the RF discharge itself in a prototype device. When the same experimental diagnostic technique was used to observe the initiation properties of a symmetric aperture, two electrode RF/dc discharge, the reflected RF power was seen to increase substantially when dc was co-applied to the elevated potential electrode 36. When dc power is co-applied to a dual-purpose elevated potential electrode in a symmetric aperture RF/dc excited laser after the RF excitation pulse has been terminated, obviously, no change in the RF reflected power is observed; in this case, higher levels of specific dc pulsed input energies can be tolerated before discharge instabilities are introduced.

With respect to the D/W>>1 discharge geometry of FIG. 4, and the identification of the longer side of the discharge chamber as being measured between electrodes, when an RF source is connected to the central elevated potential electrode 12 located in the upper ceramic sidewall 16, the central elevated potential electrode 36 located in the lower ceramic sidewall 18 is blocked for conduction of RF power as shown in FIG. 8 of the related application. This may be accomplished by, for example, using an RF choke or by connecting a LC circuit in series with the lower dc connected electrode 36. The LC circuit itself would be made shunt resonant at the RF excitation frequency and thus the LC circuit would act to keep RF power from flowing to the lower central electrode. Alternatively, the lower and upper electrodes could be connected together external to the vacuum envelope, in which case the distance between connected central electrodes and either the left or the right grounded electrodes would remain as defining the longer side of the discharge chamber cross-section. Said in another way, the longer side of the discharge chamber is identified with the distance between electrodes of opposite potential. This identification is valid in a "dual feed" configuration where both the upper and lower central elevated potential electrodes were driven in phase from a common RF source.

Such "dual feed" type arrangements, as introduced above, could be used to separate RF and dc excitation in a D/W>>1 discharge region. The dual feed geometry could also be used to apply in-phase RF only excitation from a single RF source to two nearly identical oppositely disposed, distinct RF electrodes to modify the RF field in the slice discharge chamber. For example, with reference to FIG. 4, an upper central RF electrode dc blocked by a field shaping member 28 could be connected electrically in parallel with a lower central RF electrode dc blocked by another field shaping member (not shown), and driven from a single RF source. Compared to a single feed device, with for example, a central electrode dc blocked by afield shaping member, realistically expect that the total RF field in the single feed dc blocked discharge chamber to have at least some of both horizontal and vertical RF E field components. One source of any horizontal or vertical E field components would clearly be the horizontal and vertical sides of the central electrode itself. Likewise, since the interior geometry of FIG. 4 is very compact, one should expect that the relative proximity of the horizontal interior walls of the laser's vacuum envelope to contribute to at least some horizontal E field to the total E field in the discharge chamber. Adding a second lower central RF electrode and field shaping member identical to the upper versions, would effectively position a second source of RF field just opposite the initial upper source. The principle difference between the two upper and lower electrode/field shaping members, assuming that both are driven in-phase from the same RF generator, is that because they vertically oppose each other, the vertical RF field components of the electrode combination must vectorially add out with respect to one another along the mutual symmetry line, i.e. along the transverse centerline of the slice discharge chamber. Said in another way, while the horizontal components of the RF field from the electrode/ field shaping pair would reinforce each other, the vertical components of RF field would have anti-symmetry and would vectorially null out. The original of this type of vectorial analysis is due to Lord Kelvin (1824–1907) who developed the "electrical image" approach for determining the E fields due to complicated multi-charge static sources. Employing Lord Kelvin's approach to the case of an in-phase, dual feel slice discharge chamber leads one to conclude that, if desired, the total transverse slice RF field could be tailored to at least minimize, if not eliminate, any vertical components of RF field in the discharge chamber. However, based on the improved performance brought about using a field shaping member in a single feed discharge chamber, which has been found experimentally to have significant horizontal and vertical RF field components, it is very clear that it is beneficial and desirous to have at least some fraction of vertical RF fields in the slice discharge chamber. With regard to the in-phase dual feed approach to oppositely disposed elevated potential electrodes, it is hereby disclosed that 180 degree phasing would be applicable to a dual (or more) feed approach to a set of adjacently disposed elevated potential electrodes.

It is well known in the art of $CO_2$ lasers that are energized from a single electrical source (which must both initiate and maintain the discharge), the resulting discharge E/p is too high for optimum excitation, and that lowering the E/p would be very beneficial. With respect to RF or RF/dc excited slab or slice lasers, this means that improved results would be achieved if the discharge E/p could be lowered in a systematic manner. One such way of achieving a lower discharge E/p is to (a) provide discharge power from a source independent of the basic discharge initiation source, i.e., an auxiliary source that provides discharge pumping at a voltage too low to initiate ionization of the discharge by itself, (b) to increase the gas pressure for a given input power without causing an increase in gas temperature, i.e., increase p while compensating with a decrease in W, and (c) reduce the loss of ionic specie to the discharge so that the charged particle production rate is balanced off at a somewhat lower average energy of the electron energy distribution. All of the above factors are interactive and all are highly geometry dependent. For example, due to the comparatively low ionic sheath volume in a slice discharge, the loss rate for ionic specie to the discharge is conceivably too low for the level of RF ionization. For such a case, the average energy of the physically realized electron distribution would migrate higher than desired because of the effective over-ionization resulting from the reduced rate of ion loss. In this case, an RF discharge electric field for devices like those shown in FIGS. 2 and 4A would desirably have a vertical component of RF field to provide an electron drift velocity with a non-parallel sidewall component. Alternatively, if the realized total RF field in the above FIGS. 2 to 4A devices has too much vertical RF field component, the loss rate for ionic specie via ambipolar diffusion could be too high thereby resulting in an average electron energy distribution that is being maintained at a level in excess of that for optimum laser excitation. For this case, it would be beneficial for laser operation if the vertical component of th total RF electric field were lowered to reduce losses of charged specie to the sidewalls. These two divergent cases argues for a means whereby the vertical and horizontal components of the slice RF discharge electric field can be systematically altered to tailor the discharge E/p for optimum excitation.

Recent measurements of the horizontal and vertical RF field components in both 22 mm and 31 mm wide split discharge geometries has confirmed a number of aspects of the vector "image" analysis and an electrostatic model analysis. One aspect is existence of both $E_x$ and $E_y$ fields in the slice discharge chamber. Another aspect is that peak in both the $E_x$ and $E_y$ occur just under the central electrode in a single feed device. Yet another aspect is the ratio of $E_x$ and $E_y$ change across the slice aperture. Still another is a field reversal in a split discharge slice aperture. In view of these field measurement results, several observations of discharge luminosity are now understandable. For example, when the discharge is viewed from one end of the laser through a quartz window, the central region just under th elevated potential electrode is seen to be somewhat more luminous or brighter than regions near the two grounded outer electrode. In view of the confirmed nature of the horizontal and vertical E field components and in particular the relative maximum of these components under a single central electrode, it is not surprising that there is no notable "minimum" or split in the discharge light. Consequently, splitting of the discharge into left and right hand segments does not appear to have made any compromise to the basic very stable and robust D/W>>1 slice discharge geometry. In view of the means available for tailoring the transverse discharge E fields, extension of the multi-driven in-phase adjacent geometries can be extended to apertures many tens of cm in width.

The discharge chambers of the devices depicted in FIGS. 1–4 are made sufficiently long so that the short side of the discharge chamber is suitable for guiding the intracavity laser light generated via laser oscillation. The largest Fresnel number used in the above devices associated with dimension W in this dimension was $N_w$=0.81. However, if a more compact size of device were desired for a given application, the length of the laser could easily be reduced to 21 cm rather than the 42 cm length used to generate the data described above. For a device of this length, the Fresnel number $N_w$ would be about 1.6, and therefore the laser cavity for such a laser would be most appropriately one that is freespace stable in the transverse discharge dimension W. In the discharge aperture dimension D, the devices corresponding to the data above were such that the operational optical resonators were either unstable or freespace stable. Also, while only two mirror optical cavities were used for the above data, other multipass geometries have been implemented to reduce the aspect ratio of the output beam shape.

For the 31 mm wide discharge aperture, operation on the 9.3 um line corresponded to a $N_D$=61.5, while $N_D$=31.0 for the same operation using the 22 mm wide geometry. The initial optical resonators for the above devices operated as hybrid cavities, being single mode waveguide in the discharge sidewall spacing W and either multimode freespace stable in the wide transverse aperture dimension (31 mm or 22 mm) or single mode unstable resonator.

For example, to obtain multimode freespace stable operation a 21 MCC silicon mirror coated for maximum reflectivity at 10.6 um was used in combination with a 10 MCC radius of curvature ZnSe output coupler whose front surface was coated with a 90%R at 9 um and whose rear surface had a 10 MCX surface with an AR coating.

To obtain a single mode unstable resonator output the output coupler was changed to a 20 MCX ZnSe output coupler whose front surface was coated with a 85%R at 9 um and whose 20 MCC rear surface was AR coated. This cavity was a slightly non-confocal, positive branch unstable resonator in the 22 mm or 31 mm aperture dimension, where the principal output coupling was via the 15% transmissivity of the output mirror. Comparable output energies were obtained with both the waveguide-multimode freespace stable cavity (WG-MMFSS) and the waveguide-partially transmitting positive ranch unstable resonator (WG-PTPBUR).

Notably, since the ZnSe output mirror for both cavity types above had a higher reflectivity at 9.3 um than t 10.6 um, the output was on the high gain, 9.3 um line, because operation at 10 um was effectively suppressed below threshold for oscillation by the output reflectivity at this wavelength. Also, when equal output reflectivities were used in the WG-MMFSS cavity and the WG-PTPBUR, the output energy per pulse was about 5% higher with the WG-MMFSS cavity. This implies that the output energy lost to diffraction in the PT-PTPBUR was only about 5%, since the principal output coupling in both resonators was via the 85% R output coupling mirror. When near field scans of the amplitude of the output mode vs. position across the output aperture, both cavities were observed to have a maximum on axis (i.e., coinciding with the approximate location of the central elevated potential electrode).

A third type of cavity using a 21 MCC max R silicon mirror and a 20 MCX max R silicon mirror with a 2.4 mm hole was also employed. In this case, the 2.4 mm hole was located in the center of the 20 MCX max R and vacuum sealed with an AR coated window at or near the rear surface of the 20 MCX mirror. This cavity was called a WG-HCPBUR (for hole coupled positive branch unstable resonator) and had a geometric output coupling of about 4.1% due to the central hole. For the same input energy per pulse, the output of the HCPBUR was only 54% that of the PTPBUR cavity; however, the near field output of the HCPBUR was observed to be a 2.4 mm diameter round spot. On the basis of this very preliminary data, one can see that the HCPBUR type of cavity could be a simple and effective means by which a symmetric output beam shape could be obtained from a D/W>>1 cavity. Based on the data, it appears that a larger diameter central hole would be a logical improvement to this cavity approach if an output more comparable to either the PTPBUR or the MMFSS was desired.

In accordance with the teachings in U.S. Pat. No. 4,809,284, by introducing a flat metal object 0.030" wide by 0.090" high by 18" long, the RF electric field in elongated area cooled discharge chambers of differing shapes and sizes has been probed to determine the extent to which the RF E fields at the frequency of excitation are uniform. By first introducing the object with the 0.030" side vertically oriented and subsequent using the object with the 0.030" side horizontally oriented, the frequency shift at which the VSWR minimum of the laser and laser matching circuit combination occurs was determined. For a given very accurately known location in the transverse discharge chamber aperture, the frequency shift observed with the object oriented vertically vs. horizontally was found to be different. In addition to the use of a long flat rod to probe the transverse E fields at or very near the 27.120 MHz excitation frequency a round rod with a cross-sectional area essentially equal to the flat rod was also used. Use of a round rod as a perturbing object allows both $E_x$ and $E_y$ components of the RF field to be equally probed. Notably, some of the frequency shifts measured caused by the various objects were as little as a few hundred Hz from the unperturbed resonant frequency of the laser head and matching network combination. For example, in the 22 mm by 3.56 mm aperture split discharge slice laser a frequency shift of minus 200 Hz from the drive frequency of 27.120 MHz corresponds to a local increase in the discharge head capacitance from 72.2 pF to 72.202 pF. This indicates that the metal rod used to perturb the capacitive space of the slice discharge chamber did not cause significant distortion of the unperturbed slice discharge E field. Since the magnitude of the frequency shift can be shown to be directly proportional to the frequency shift, the measurements of relative field strength that are inferred from the measured shifts indicate that (1) neither the x or y components of total field have a zero just under the central electrode, and (2) the x and y components are not equal. Thus, it is a certainty that x and y components of the slice split discharge RF field will give rise to charged specie drift velocities, electron distribution energies and charged specie loss and production rates that will be highly configuration or geometry dependent. Said in another way, it is a certainty that the choice of either dual in-phase feed or single feed augmented with or without field shaping members, or any combination of these elements, can be used to tailor the discharge E fields and to thereby tune the kinetic discharge pumping processes in the laser. For example, because of the decoupling of pressure and excitation frequency, the oscillatory reversal period of the discharge electric field can be selected without regard to gas pressure. Thus, the loss rate for charged specie via either ambipolar diffusion or by electron loss can be lowered by increasing the discharge pressure. On a plasma kinetic basis, this in turn will incrementally favor a loss rate of charged specie on a volumetric basis as opposed to a loss rate of charged specie via wall collisions. Adjusting the relative strength of RF field components in the discharge chamber parallel and perpendicular to the sidewalls can then be used to either enhance or retard the loss of a particular charged specie via the systematic vectoring of the relevant RF E field controlled drift velocities. Sidewall separation, excitation frequency and vectoring of charged specie via draft velocities can be controlled independently to fine tune the effects of increasing pressure. Notably, the effect of potential barriers or potential wells caused by plasma sheaths do not have to be contended with because the sidewalls are not host surfaces for such sheaths or wells.

The implication of the above-discussed transverse RF field uniformity experiments is very clear; the shape of the discharge chamber can be used to modify or control the components of RF discharge chamber electric field and thereby influence very fundamental aspects of the plasma kinetic pumping process. Therefore, while the teachings herein regarding $D/W>>1$ area cooled laser embodiments has thus far been shown with generally rectangular discharge chambers, other multi-sided polygonal shapes can be employed in $D/W>>1$ discharge chambers. The advantage to such other shapes would be to further modify or otherwise adjust the ratio of RF field components to obtain discharge pumping kinetics, gain medium kinetics or discharge characteristics more suitable for a given optical resonator choice. For such polygonal shapes, the $D/W>>1$ rectangular shaped relationship translates into the requirement that the sum of the lengths of the polygon sides between the electrodes be greater than the sum of polygon sides between the sidewalls of such polygonal discharge chamber.

One such polygonal shape for the transverse aperture is shown in FIG. 12 and is particularly suited for use with an optical cavity like the WG-HCBUR, where output is extracted via a hole in the central region of the convex, maximum R unstable resonator mirror. The previously disclosed $D/W>>1$ discharge chambers had a generally rectangular shape with a longer and a shorter side, the longer side being measured between the electrodes. The shape of these area cooled discharge chambers transverse to the longitudinal optical axis are depicted as rectangles and drawn in a coordinate system whose two axes are straight lines. By long standing convention, coordinate systems whose axes are straight lines are called Cartesian systems, named in honor of Descartes (1596–1650). The special case where the Cartesian axes do not meet obliquely, i.e., meet at right angles, are called orthogonal Cartesian or more familiarly rectangular coordinate systems. By convention, curvilinear coordinate systems or curvilinear spaces are those that have at least one non-Cartesian axis. (Ref. Moon and Spencer, *Vectors*, p34, copyright 1965, D. Van Nostrand Co.).

Transformations between different Cartesian systems are efficiently and most elegantly described using transformation equations that relate a given Cartesian axis in one system to its counterpart in the new system, and the operational set of these equations, in matrix form, is called the transformation matrix of, or between, the two systems. For the more general case of transformations between Cartesian systems and curvilinear coordinate systems, the transformation matrix is a bivalent holor at least some of whose matrix elements, or merates, are functions whose numerical value at a particular point in the curvilinear space is a function of position in the curvilinear space (Ref. *Vectors*, p18, 36, 70). A curvilinear space thus is one wherein at least some of the merates of the transformation matrix for a point P being described in both a Cartesian and a curvilinear space may change as the point P is moved. For the purposes depicting $D/W>>1$ area cooled lasers, use is made of coordinate spaces that are metric, or where the distance between two nearby points is defined. In such spaces, distance is desirably a scalar invariant and thus the transformation matrix between a Cartesian metric space and a curvilinear metric space is one where the bivalent holor transformation matrix is a covariant bivalent tensor (Ref. *Vectors*, p90, 93).

Figure 13:
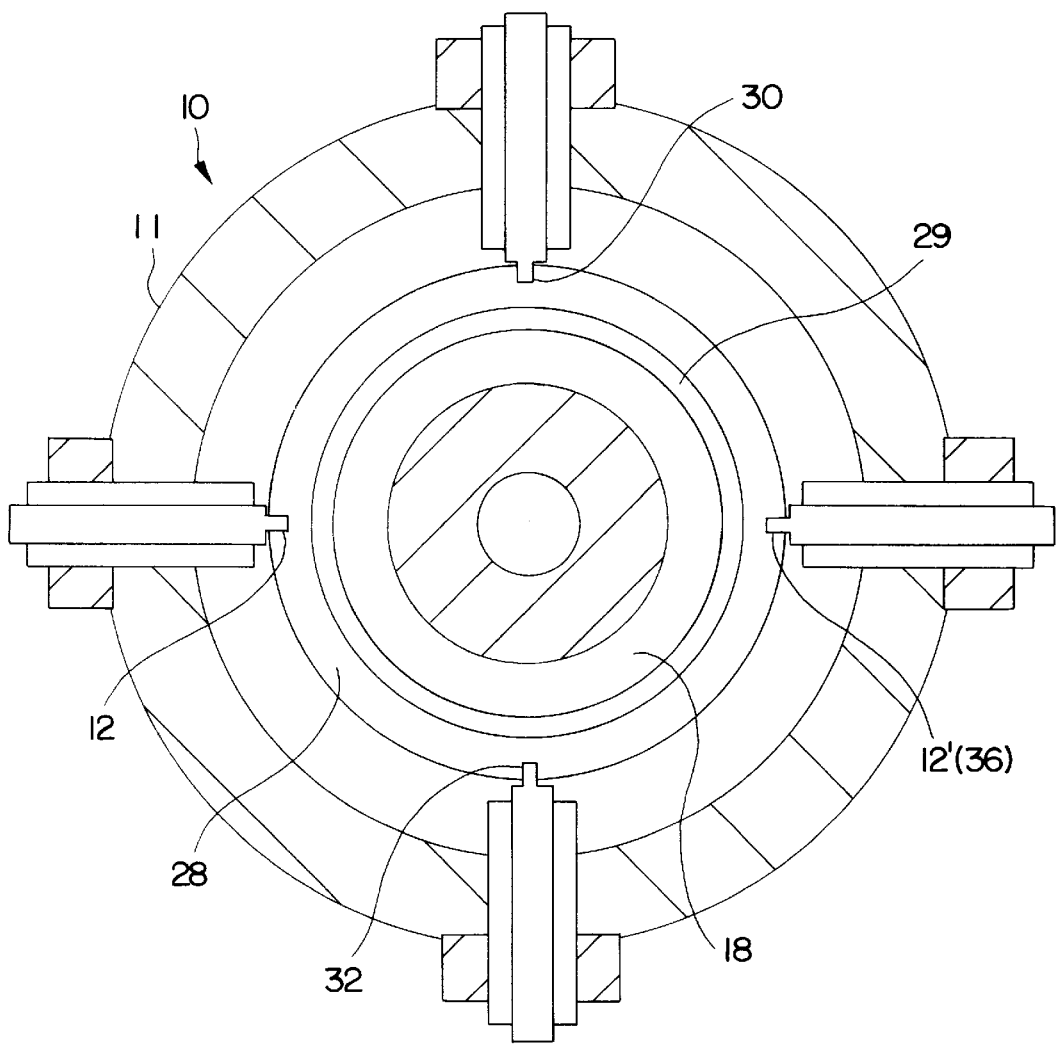
FIG. 13 is a cross-sectional, side elevational view of still another embodiment of a segmented discharge, RF gas laser in accordance with the invention.

In accordance with the teachings herein, one version of a compact geometry combining high discharge volume in a short device length is shown in the centrally fluid coded FIG. 13 slice embodiment. The transverse discharge geometry is easily depicted in a common curvilinear coordinate system with one axis being straight radial lines and the other being concentric circles. Since one axis of this coordinate space is one of a set of concentric circles (where the radius is a constant), the space is non-Cartesian, even though the other axis is one of a set of radial straight lines (where the polar angle is constant). This curvilinear coordinate system is called polar coordinates and is well recognized as an orthogonal space because the two axes of this curvilinear space (in which $D/W>>1$ transverse discharge cross sectional shapes may be described) meet at an angle such that one axis does not have a component lying along the other axis. It is well known that the polar coordinate system is only one of a large number of non-Cartesian, orthogonal coordinate systems. Other examples of such orthogonal systems are Tangent Circles, Cardioids, Bipolar Circles and Inverse Ellipses. (Ref. Moon and Spencer, "*Field Theory Handbook*", copyright 1961, Springer Verlag.

Following the standard treatment in textbooks on complex variables and conformal mapping such as (Walker, "*Methods of Theoretical Physics*" and Churchill, "*Complex Variables and Applications*", Morse and Feshbach, "*Methods of Theoretical Physics*" and Spiegel, "*Complex Variables with an Introduction to Conformal Mapping and its Application*", copyright Schaum's Outline Series, 1964, it is well known that transformations between a Cartesian coordinate system and other orthogonal non-Cartesian coordinate systems can be described by conformal transformations, whose transformation or mapping equations are functions of a complex variable. The very useful and well known conformal mapping formalism allows, for example, a rectangular coordinate system to be mapped into polar coordinates or conversely, for polar coordinates to be mapped into rectangular space. A particular mapping function or transformation equation may be chosen through either experience or by application of analytic continuation.

Or such a function might be dictated by a particular desired characteristic of discharge electric field, ease of actual hardware fabrication, associated with a modification of a boundary shape for the transfer of heat or may be found by the Schwartz-Christoffel method (*Ref. Methods of Theoretical Physics,* Part I, Ch. 4.0, pp 348ff, Copyright McGraw Hill, 1953.

In a very general way, it can be shown that if certain conditions, called the Cauchy-Riemann (or C-R) conditions, are satisfied by the mapping or transformation equations, then physical problems in such diverse areas as heat transfer, fluid flow, electrostatics or elecrodynamics can be more easily solved. In specific relation to the D/W>>1 slice discharge geometry, if a coordinate transformation is made with a function that satisfies the C-R conditions, not only can the potential or electric field in a curvilinear shaped discharge chamber be more readily determined, the basic Cartesian rectangular shape in the familiar rectangular Cartesian coordinate space can be mapped into a wide variety of other non-Cartesian coordinate systems while still maintaining the shape's essential unique features. Thus, for example, squares or rectangles in the common (x,y) plane map into an equivalent curvilinear square or curvilinear rectangle in the transformed space.

In general, then if a mapping function w(z)

$$w(z)=U(x,y)+iV(x,y),$$

wherein z=x+iy satisfies the Cauchy-Riemann conditions, which are:

$$\frac{\partial U(x, y)}{\partial x} = \frac{\partial V(x, y)}{\partial y} \text{ and } \frac{\partial U(x, y)}{\partial y} = -\frac{\partial V(x, y)}{\partial x}$$

These two equations together imply $$\{\text{grad } U(x,y)\}\cdot\{\text{grad } V(x,y)\}=0$$

Thus, because the gradients of the functions that describe the two axes in (U,V) space have a zero inner product, one curvilinear axis does not have any projection component on the other curvilinear axis. Said in another way, if a square or rectangular shape in (x,y) space is mapped into (U,V) space, the sides of the resulting curvilinear square or curvilinear rectangle in the (u,V) space are guaranteed to be orthogonal because the curvilinear shape is the result of a conformal transformation whose initial shape in (x,y) space had right angles and whose mapping or transformation equation satisfied the C-R conditions. In the context of the inventions herein disclosed, a conformal representation {in (U,V) curvilinear space} of a Cartesian rectangle {in (x,y) space} is a curvilinear cross sectional shape that is the result of a conformal mapping, the result of a conformal transformation or is the result of a mapping using a function that satisfies the C-R conditions, of an initial D/W>1 rectangle.

The reference to shape above may be taken to be either the shape of the discharge chamber in the transverse plane, i.e., normal to the longitudinal axis of a two mirror optical cavity for said discharge shape or shape may be taken to be of the shape of the optical mode transverse to the longitudinal axis of the cavity's resonator, or shape may be taken to describe the overall geometric arrangement of optical elements at either end of a lasers discharge chamber.

Figure 14:
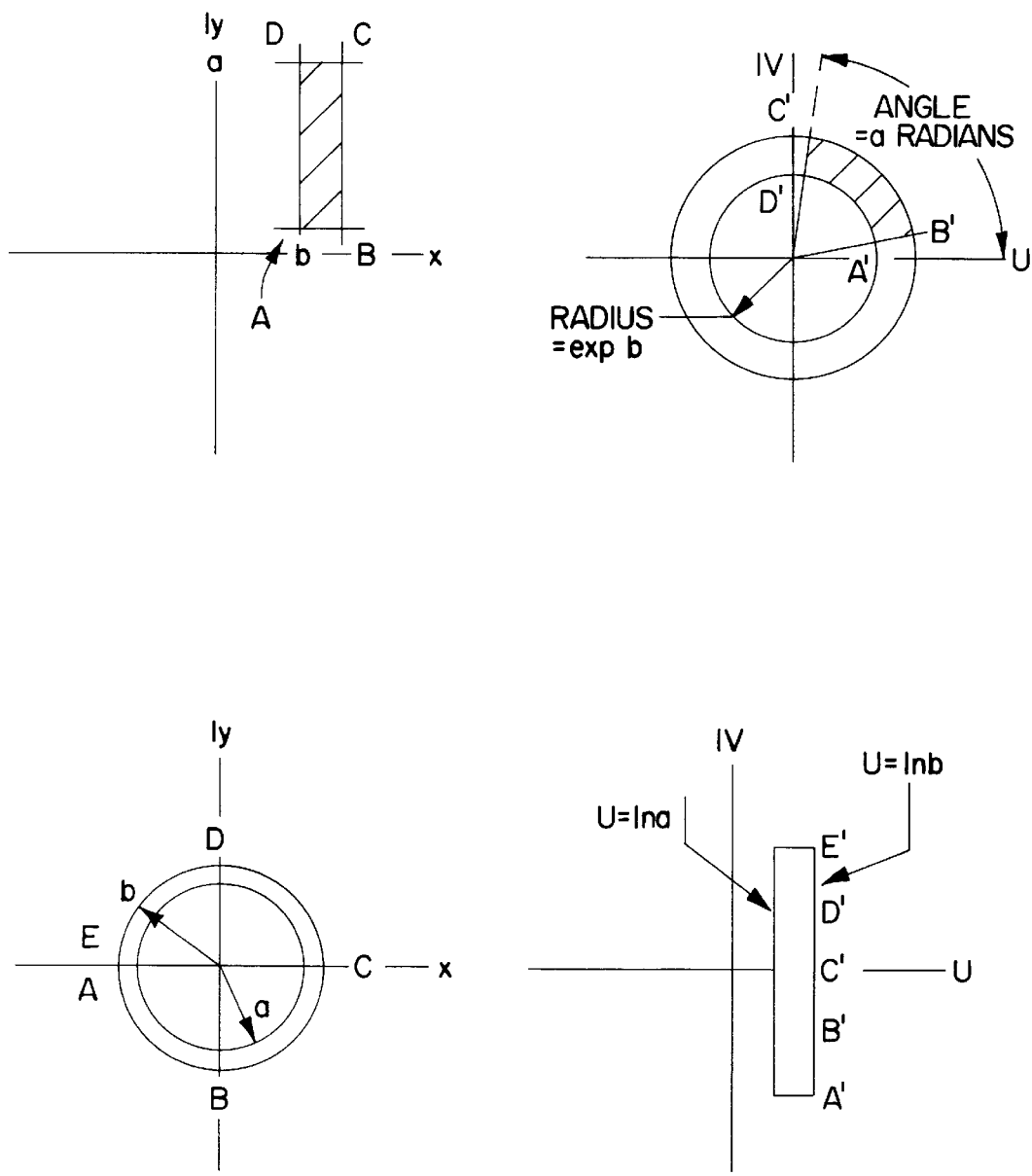
FIG. 14 diagramatically illustrates the geometric similarity of the embodiment of FIG. 13 with the other disclosed embodiments of the invention.

FIG. 14 illustrates the mapping of a rectangular shape in (x,iy) space into an annular shape in the (U, iV) space according to the conformal mapping function w(z)=exp(z)= $e^z$, where z=x+iy. w(z) is noted to be a mapping function that satisfied the C-R conditions (Ref. Churchill, p86, p285). Relative to the teachings herein, the discharge chamber shape in the upper right panel of FIG. 14 is clearly representative of the geometry shown in FIG. 1 if the (x,y) shape is positioned in the (x,y) plane as shown in FIG. 14. If the electrodes are located along the line segments AB and CD in the (x,y) space of this figure, then the electrodes would be located along radii segments A'B' and C'D' in the (U,V) space. Thus, according to the teachings of the related application and herein for D/W>>1 discharge chambers, in both the (x,y) space and the (U,V) space, the transverse shape of the discharge chamber would have substantially longer and shorter sides, the longer side being measured between the electrodes with the shorter side being orthogonal to the longer side. Since the mapping function w(z)=$e^z$ satisfies the C-R conditions, the orthogonality of the longer and shorter sides in (U,V) space is guaranteed.

If the rectangular shape in the upper left half of FIG. 14 was positioned in (x,y) space so that the line segment AB was on the x axis in (x,y) space, then the corresponding curvilinear annular shape in the (U,V) space would occupy the upper half plane of the (U,V) space, whereas if the rectangular shape was located symmetrically with respect to the x axis in (x,y), then the corresponding curvilinear annular shape in the (U,V) space would be a 360° annulus. As before, according to the teachings herein regarding D/W>>1 laser discharge devices, the generalized shape of the discharge space transverse to a laser's longitudinal optical axis would have a longer side and a shorter side, with the shorter side being measured between the discharge chamber sidewalls located at y=$b_1$ and y=$b_2$ in (x,y) space {or radii exp ($b_1$) and exp ($b_2$) in (U,V) space} and the longer side measured between the electrodes and also being orthogonal to the shorter side in either (x,y) space or the conformally transformed (U,V) space.

Notably, the inverse conformal transformation w(z)=ln (z), mapping an annular region described in (x,y) space as shown in the lower half of FIG. 14 to the rectangular region in (U,V) space, is another mapping function that satisfies the C-R conditions. For this (x,y) annular shape, the region mapped is a full 360° annulus, and thus the discharge chamber shape transverse to the longitudinal axis of the laser in (U,V) space is a shape that is positioned symmetrically with respect to the U axis. As before with the transformation w(z)=exp(z), the inverse mapping w(z)=ln(z) is conformal, satisfies the C-R conditions, and therefore angles of shapes mapped between these coordinate spaces are preserved.

Consequently, as shown in FIG. 13, if there were four segments of discharge generated "azimuthally", i.e., where the discharge region has a curvilinear shape wherein the mean distance from the origin in (x,y) space is constant, or between radii a and b in the lower left hand panel of FIG. 14, each of these azimuthal segments would have a laser discharge plasma that has a conduction path being directed along a segment of annulus at a constant distance from the origin of the figure in the left hand panel as seen in (x,y) space. the curvilinear discharge cross sectional shape transverse to the laser's longitudinal axis, as before, can then be described as having a longer and a shorter side, the shorter side being measured between an inner sidewall located at radius a and an outer sidewall located at radius b with the longer side being measured between any two adjacent electrodes, and with the shorter side being orthogonal to the longer side of the discharge chamber shape. If a four segment annular region like that depicted in FIG. 13 is transformed onto the (U,V) plane via the function w(z)=n(z), the transformed discharge shape normal to the laser's longitudinal axis would have an ordinary rectangular shape with a longer and a shorter side and whose sides are perpendicular and whose sidewalls measured between lines of constant U at U=ln(a) and U=ln(b) define the shorter side of the discharge shape in the (U,V) coordinate space.

The formalism of mapping a D/W>>1 transverse rectangular discharge shape in (x,y) coordinates {where the capital W here refers to the metric distance in units of length between the sidewalls, and a small w refers to the mapping function w(z)} made according to the teachings herein using transformation equations w(z) that satisfy the C-R conditions, is sufficiently general in scope so that a Cartesian rectangular D/W>>1 shape can be mapped into another curvilinear orthogonal shape without changing the basic D/W>>1 relationship between the electrode separation and the sidewall separation. Thus, a conformal mapping of D/W>>1 area cooled laser rectangular discharge chamber cross section shape cannot alter it into a prior art D/W<<1 area cooled discharge chamber shape.

A particular conformal transformation like $w(z)=e^z$ may be chosen to more easily describe the azimuthal geometry of FIG. 13, one advantage of which is the accommodation of more discharge cooling area into a given device length. Another choice of transformation might be via w(z)=sin (z) which then would transform the D/W>>1 (x,y) rectangular shaped discharge region to a semi-elliptical (U,V) orthogonal curvilinear annular shaped region; or the D/W>>1 (x,y) rectangular shaped discharge region could be transformed to a (U,V) curvilinear orthogonal shape defined between a pair of parabolas via the mapping function $z=[w(z)^2]/2$; or D/W>>1 (x,y) rectangular shape could be transformed to a (u,V) curvilinear orthogonal shape in the hyperbolic system via the transformation $w(z)=z^2/2$. All of these above functions w(z) satisfy the C-R conditions and describe conformal mappings.

However, whether the above conformal mapping functions or other functions w(z) are used, as long as the C-R conditions are met, the strictly rectangular shape of the D/W>>1 discharge chamber in (x,y)space will be transformed into an orthogonal D/W>>1 curvilinear shape in (U,V) space wherein the fundamental relationship between the electrode spacing and sidewall spacing remain invariant. Said in another way, since angles are preserved by conformal mapping, the metric relationship between electrodes and the longer side of a discharge space cross-section and the metric relationship between the sidewalls in an initial slice D/W>>1, (x,y) space discharge chamber cross sections will remain fundamentally unchanged with respect to the longer and shorter sides of the curvilinear slice D/W>>1, (U,V) space discharge chamber cross-sections. Also, because of the fundamental properties of conformal mapping, the uniqueness of any given slice D/W>>1 area cooled laser discharge shape cross-section, whether orthogonal or polygonal, will remain always distinct from any prior art D/W<<1 area cooled laser discharge shape cross-section, as long as the mapping function W(z) belongs to the class of functions that satisfy the C-R conditions.

While preferred embodiments have been shown and described, various modifications and substitutions may be made thereto without departing from the spirit and scope of the invention. Accordingly, the invention has been described by way of illustration and not limitation.

What is claimed is:

1. A method for enhancing the performance of an RF excited gas laser, the laser having a discharge region characterized by a generally curvilinear orthogonal cross-section with an average longer dimension and an average shorter dimension, the shorter dimension being measured between non-conductive sidewalls and being sufficiently small to ensure a rate of heat transfer from the discharge region to the sidewalls to ensure maintenance of a stable discharge, the longer dimension of the discharge region cross-section being measured between electrodes of different polarity, the laser being excited by establishment of an RF field in the discharge region through connection of an RF power source between at least a first high voltage electrode and at least a first grounded electrode, the RF field ionizing a lasing gas confined in the discharge region to create a plasma discharge and the non-conductive sidewalls guiding generated coherent light, the improvement comprising:

shaping the RF field established in the discharge region by placing a ceramic insert between said first high voltage electrode and the discharge region.

2. The method of claim 1 wherein the ceramic insert will function as at least part of one of said non-conductive discharge region side walls.

3. The method of claim 2 further comprising:

additionally modifying the RF field by varying the shape of the first high voltage electrode.

4. The method of claim 3 wherein the laser includes at least a second grounded electrode, the grounded electrodes defining opposite sidewalls of the discharge region, the electrode defined opposite sidewalls extending between the non-conductive sidewalls, the first high voltage electrode being supported on one of the non-conductive sidewalls, the laser also including a fourth electrode is supported from the second of the non-conductive sidewalls at a position disposed opposite to the first high voltage electrode, wherein said method further comprising:

making the fourth electrode a mirror image of the first high voltage electrode; and connecting a source of electrical power to the fourth electrode.

5. The method of claim 4 further comprising:

recessing the fourth electrode below the surface of the second non-conductive discharge region sidewall.

6. The method of claim 5 wherein the step of connecting a power source to the fourth electrode comprises delivering RF power to the fourth electrode in phase with the RF power delivered to the first high voltage electrode.

7. The method of claim 6 further comprising:

disposing a second ceramic insert between the second high voltage electrode and the discharge region.

8. An RF excited gas laser comprising:

at least first and second spacially displaced elongated electrodes;

a non-conductive spacer;

a non-conductive field shaping member, said field shaping member overlying said first electrode, said spacer and said field shaping member cooperating to define a first pair of opposed sidewalls of an elongated gas discharge region, said discharge region having a predetermined cross-section, said discharge region cross-section being characterized by an average longer dimension and an average shorter dimension, said longer dimension being measured between said electrodes, said shorter dimension being suitable for guiding laser light, said shorter dimension being sufficiently small to achieve a rate of transfer of heat from the discharge region to said sidewalls whereby said spacer and field shaping member will area cool a plasma discharge established in said discharge region to thereby maintain a stable laser discharge;

a laser gas at a pressure p disposed in said discharge region;

a source of RF power having a pair of output terminals; and means for connecting said RF power source output terminals to respective of said electrodes to thereby establish an alternating electric field at a frequency f in said discharge region to establish a laser-exciting plasma discharge in said laser gas, said field passing through and being modified by said field shaping member.

9. The laser of claim 8 wherein said opposed sidewalls are non-planar.

10. The laser of claim 8 wherein the ratio of said average longer dimension to said average shorter dimension is greater than 1.5.

11. The laser of claim 8 wherein said longer dimension defines a discharge aperture dimension for laser light having a Fresnel number greater than unity.

12. The laser of claim 8 further comprising:

a mirror disposed adjacent each end of said discharge region, said mirrors defining the optical axis of the laser.

13. The laser of claim 12 further comprising:

a vacuum envelope, said gaseous discharge region and said mirrors being disposed in said envelope.

14. The laser of claim 8 wherein said spacer and said field shaping member are comprised of the same ceramic material.

15. The laser of claim 8 further comprising at least a third elongated electrode, said first electrode being disposed intermediate said second and third electrodes, said spacer and field shaping member extending between said second and third electrodes to at least in part define said first pair of discharge region sidewalls, said second and third electrodes defining a second pair of sidewalls of said discharge region, and wherein said connecting means connects a first terminal of said RF power source to said second and third electrodes to thereby produce a split plasma discharge in said discharge region.

16. The laser of claim 15 further comprising at least a fourth elongated electrode, said fourth electrode being disposed oppositely with respect to said first electrode, and wherein said laser also further includes a second source of electrical power for augmenting said split plasma discharge, said second power source being connected to said fourth electrode.

17. The laser of claim 16 wherein said second output terminal of said RF power source is connected to said first and fourth electrodes.

18. The laser of claim 8 wherein said opposed sidewalls are non-planar.

19. An RF excited gas laser comprising:

at least first, second and third spacially displaced electrodes;

a pair of spacially displaced non-conductive spacers, said spacers in part defining therebetween an elongated gas discharge region having a predetermined cross-section, said discharge region cross-section being characterized by an average longer dimension and an average shorter dimension, said longer dimension being measured between the most widely spaced of said electrodes, said shorter dimension being between said spacers, the first of said electrodes being intermediate and second and third electrodes and being supported from a first of said spacers, the cross-section of the portions of the discharge region disposed between said first electrode and each of said second and third electrodes being characterized by a ratio of said average longer dimension to said average small dimension which exceeds 1.5;

a laser gas mixture at a pressure p disposed in said discharge region;

a non-conductive field shaping member in registration with said first electrode, said field shaping member at least in part forming a non-conductive light guiding wall of the discharge region; and means for establishing an alternating electric field in said discharge region to establish a laser-exciting plasma discharge in said laser gas, said field establishing means coupling RF power at a frequency f to said first electrode, said excitation frequency f being at least 10 kHz.

* * * * *